(12) United States Patent
Amin et al.

(10) Patent No.: US 11,671,242 B2
(45) Date of Patent: Jun. 6, 2023

(54) UBIQUITOUS, INDUSTRY AGNOSTIC PLATFORM FOR AUTOMATED, SMART CONTRACT BASED, REAL TIME TRUSTED TRANSACTIONS

(71) Applicants: Moustafa Mohamed Amin, Cairo (EG); Mayande Gowon Walker, New York, NY (US)

(72) Inventors: Moustafa Mohamed Amin, Cairo (EG); Mayande Gowon Walker, New York, NY (US)

(73) Assignee: OpenCT, AG, Zug (CH)

( * ) Notice: Subject to any disclaimer, the term of this patent is extended or adjusted under 35 U.S.C. 154(b) by 444 days.

(21) Appl. No.: 16/779,582

(22) Filed: Feb. 1, 2020

(65) Prior Publication Data

US 2021/0243011 A1 Aug. 5, 2021

(51) Int. Cl.
| | |
|---|---|
| *H04L 9/06* | (2006.01) |
| *H04L 9/32* | (2006.01) |
| *G06Q 20/36* | (2012.01) |
| *H04L 12/14* | (2006.01) |
| *H04L 9/00* | (2022.01) |

(52) U.S. Cl.
CPC .......... *H04L 9/0643* (2013.01); *G06Q 20/36* (2013.01); *H04L 9/3213* (2013.01); *H04L 9/3263* (2013.01); *H04L 12/14* (2013.01); *G06Q 2220/00* (2013.01); *H04L 9/50* (2022.05); *H04L 2209/56* (2013.01)

(58) Field of Classification Search
CPC ... H04L 9/0643; H04L 9/3213; H04L 9/3263; H04L 12/14; H04L 2209/56; G06Q 20/36; G06Q 2220/00
See application file for complete search history.

(56) References Cited

U.S. PATENT DOCUMENTS

| | | | |
|---|---|---|---|
| 2016/0292672 A1* | 10/2016 | Fay | G06Q 20/363 |
| 2017/0078493 A1 | 3/2017 | Melika | |
| 2019/0036895 A1* | 1/2019 | Irvine | H04L 63/0428 |
| 2019/0319861 A1 | 10/2019 | Pan | |

* cited by examiner

*Primary Examiner* — Dinh T Le
(74) *Attorney, Agent, or Firm* — The Concept Law Group, PA; Scott D. Smiley; Scott M. Garrett

(57) ABSTRACT

A network platform, system and method for high volume transactions requiring verifiable transaction tracking is provided. The platform, system and method leverages the Blockchain as a ledger for tracking, e.g., bandwidth usage at a granular level, allowing for efficiency in selling parts of a pipeline, instead of the entire pipeline itself. Also provided is a platform, system and method which leverages the Blockchain to facilitate financial transactions such as trading, medical records ledgers, energy enterprises, supply chain functions, real estate asset management, intellectual property tokenization and cryptocurrency transactions.

20 Claims, 30 Drawing Sheets

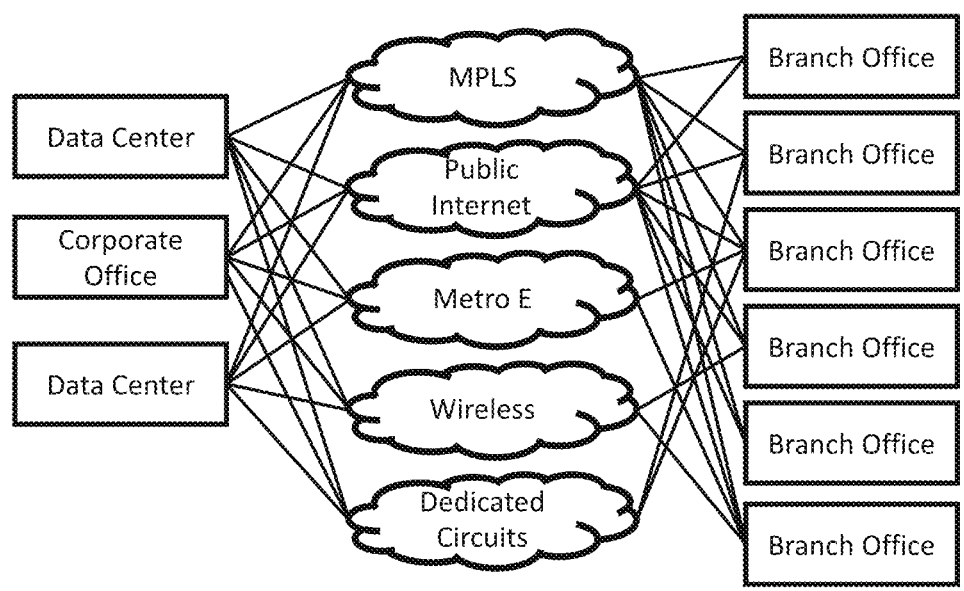
Figure 4. WAN

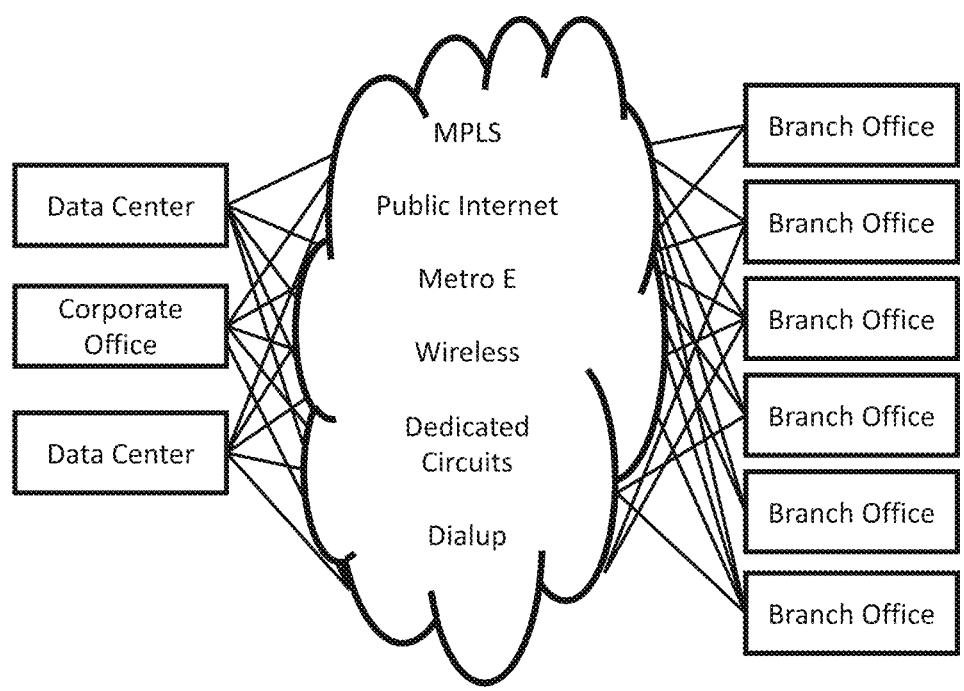
Figure 5. SD-WAN

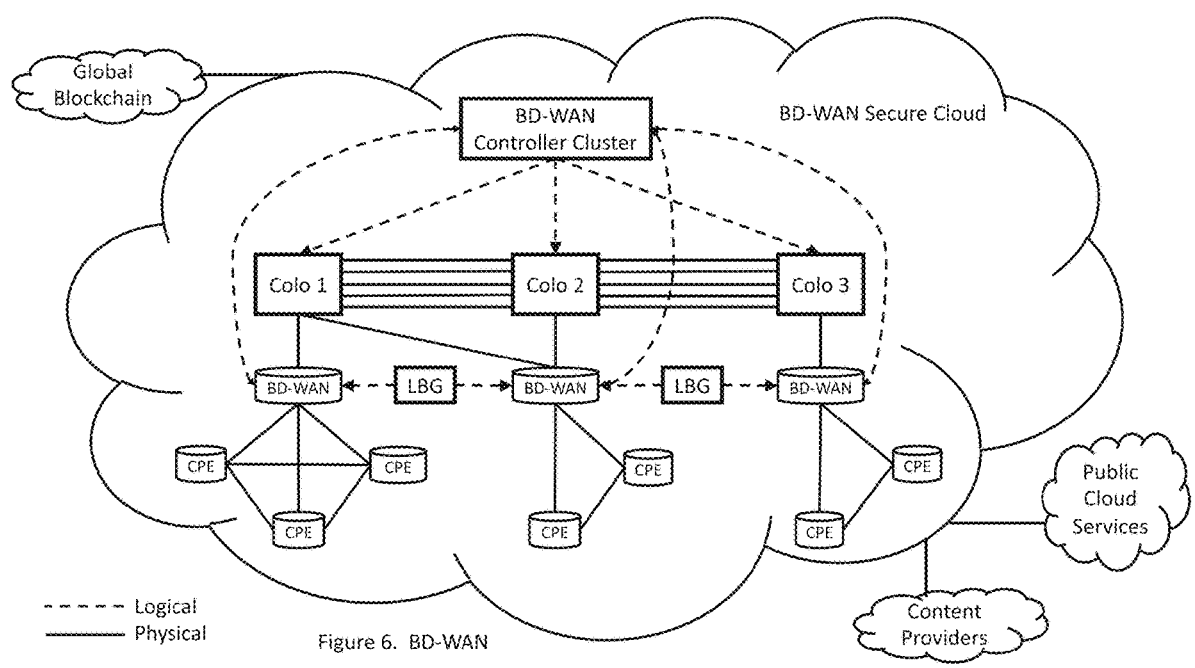
Figure 6. BD-WAN

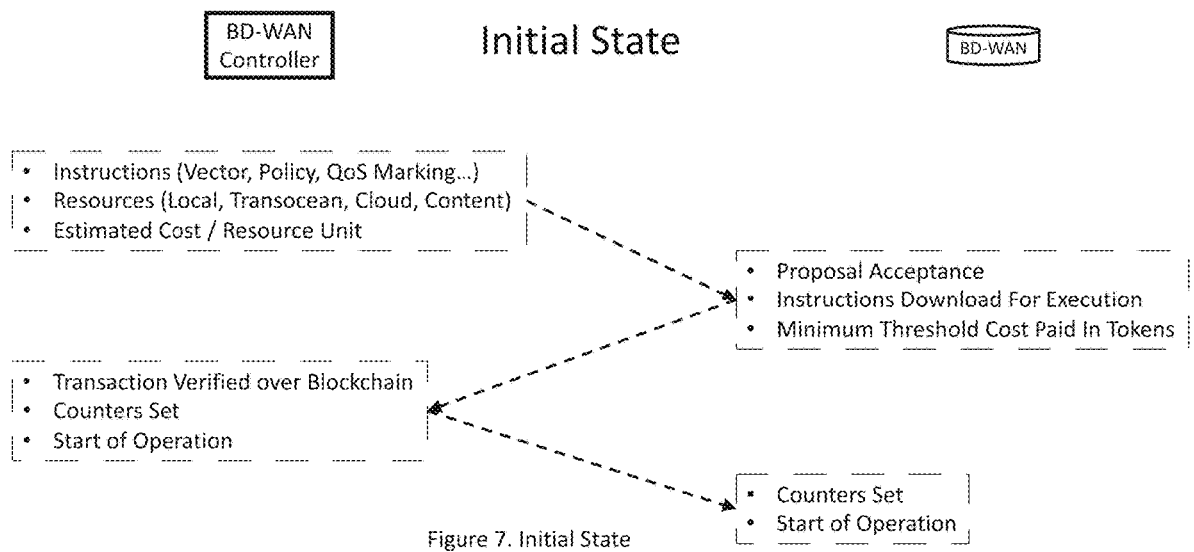
Figure 7. Initial State

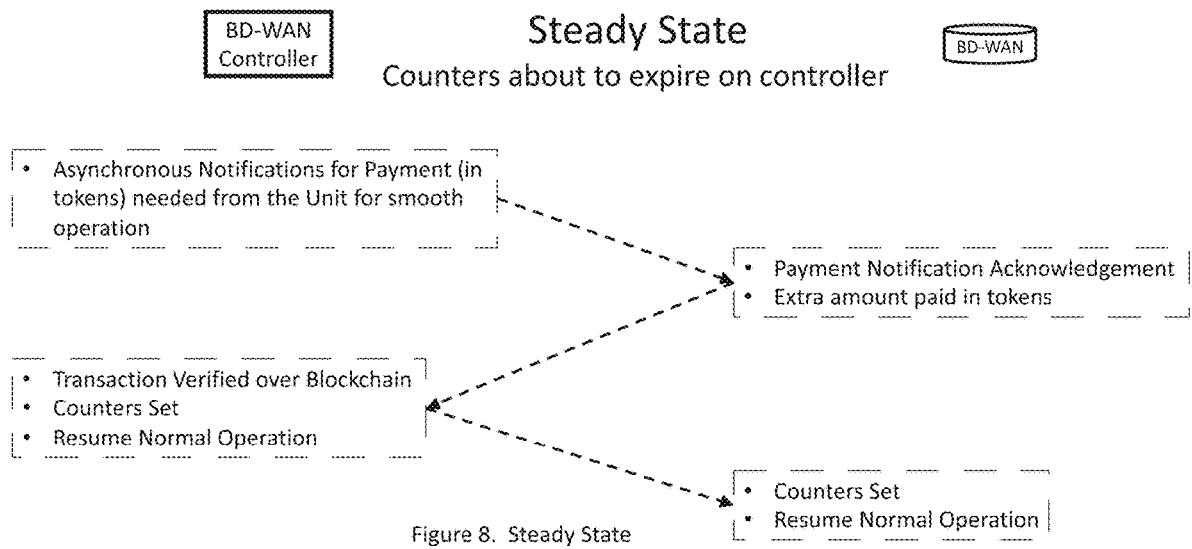
Figure 8. Steady State

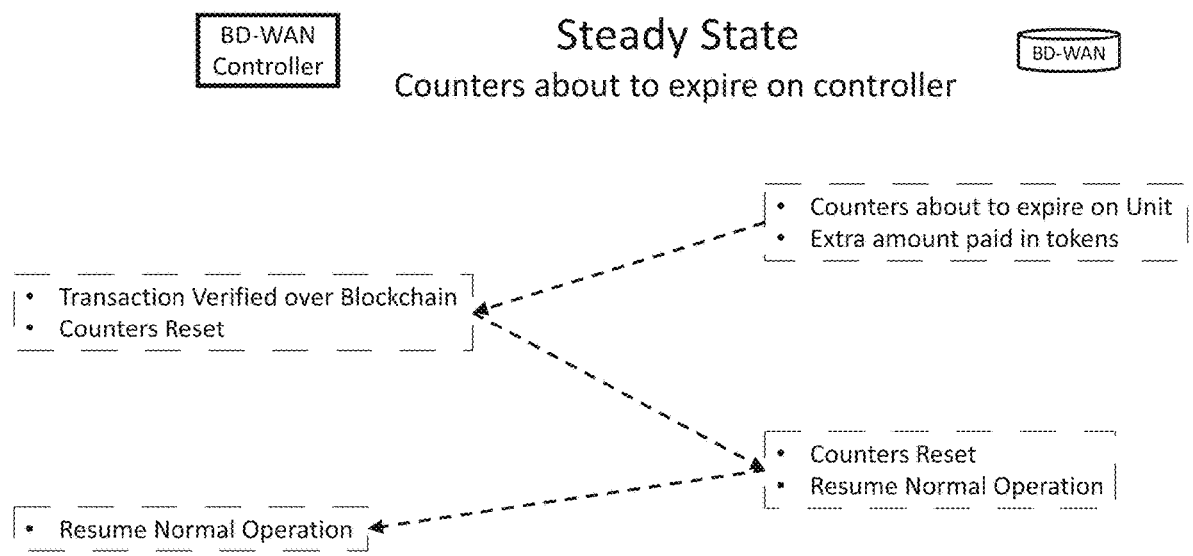
Figure 9. Steady State

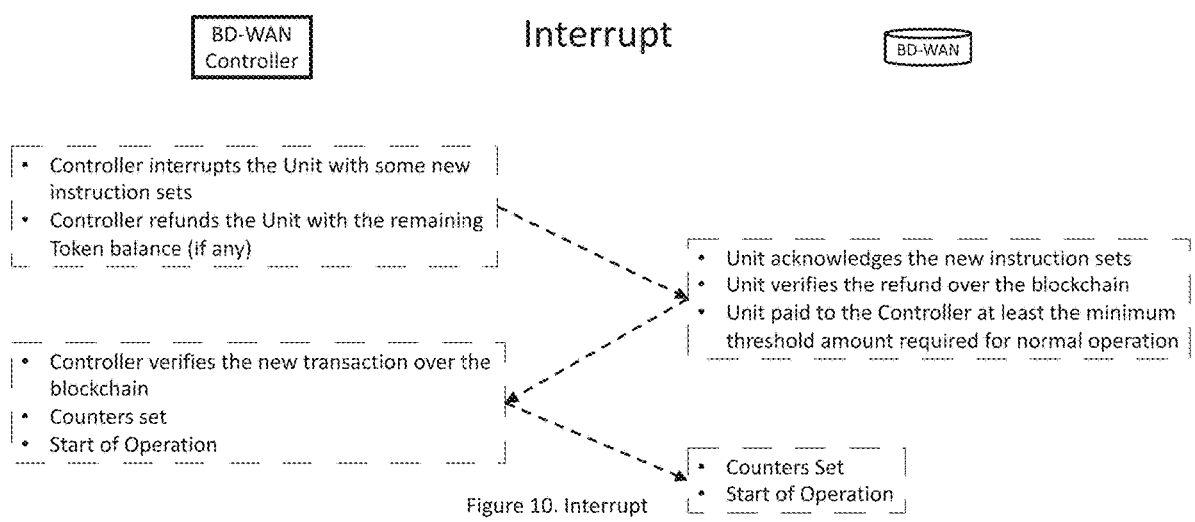
Figure 10. Interrupt

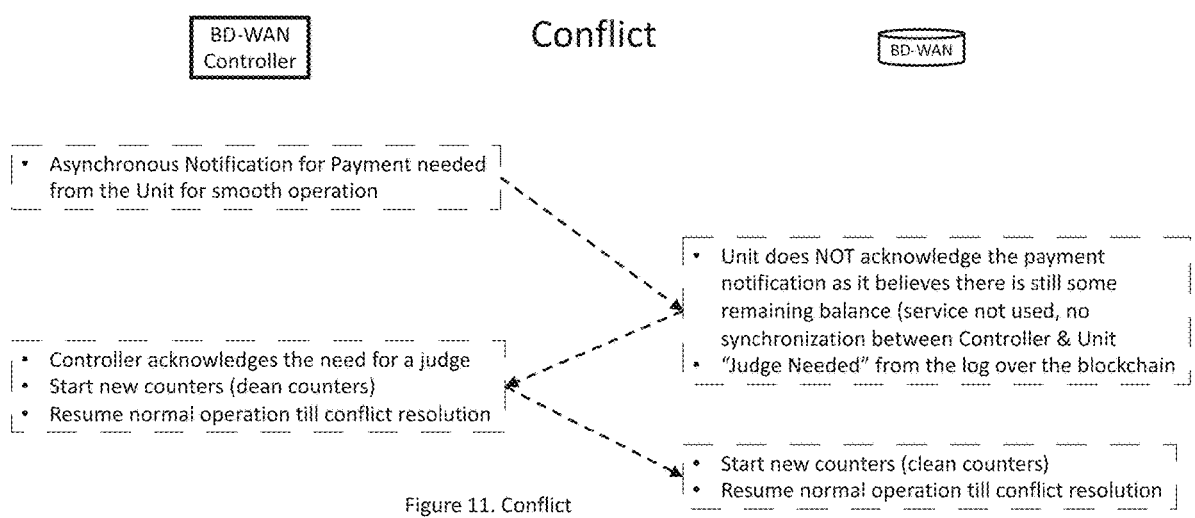
Figure 11. Conflict

Figure 12. Hexadecimal Conversion

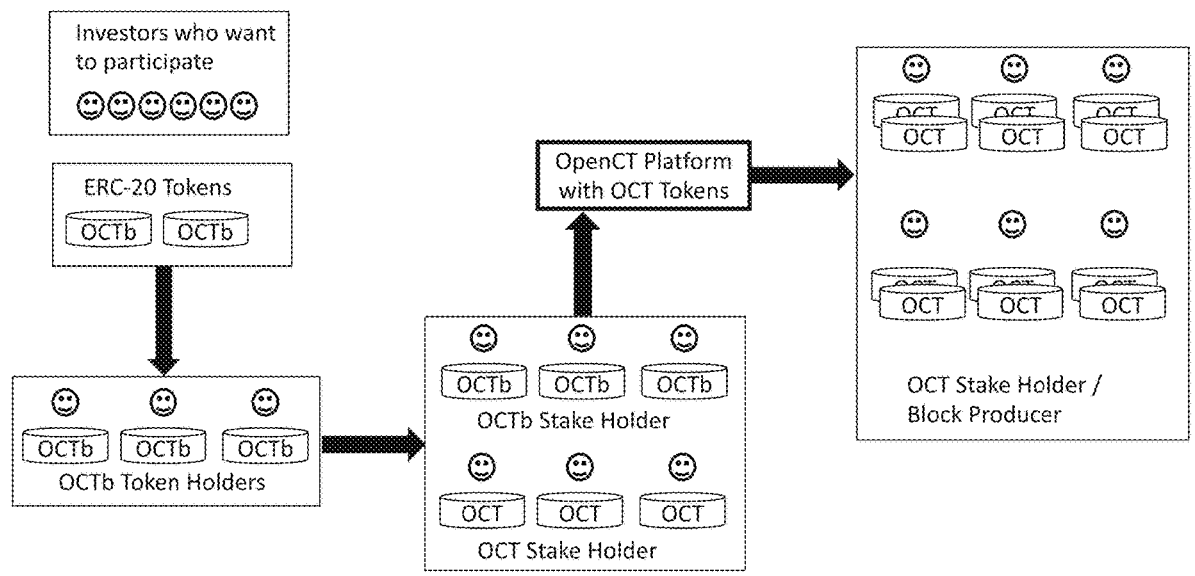
Figure 13. OCT Reward System

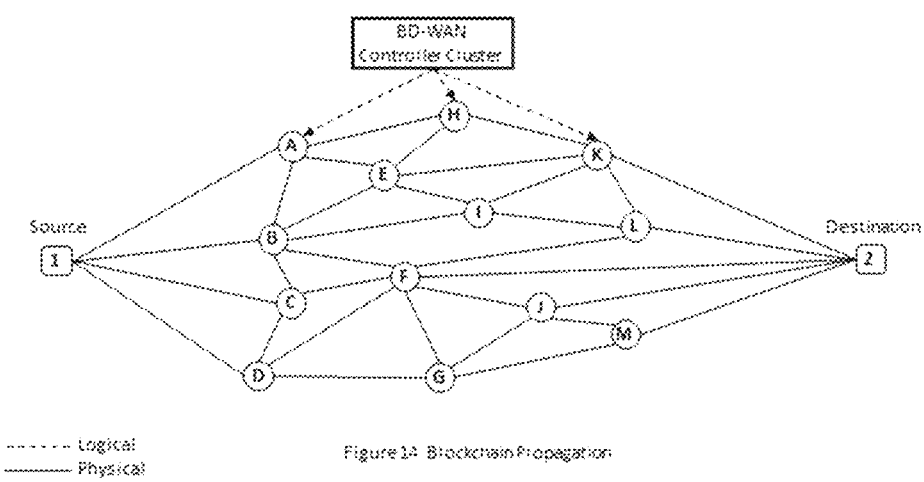
Figure 1A Blockchain Propagation

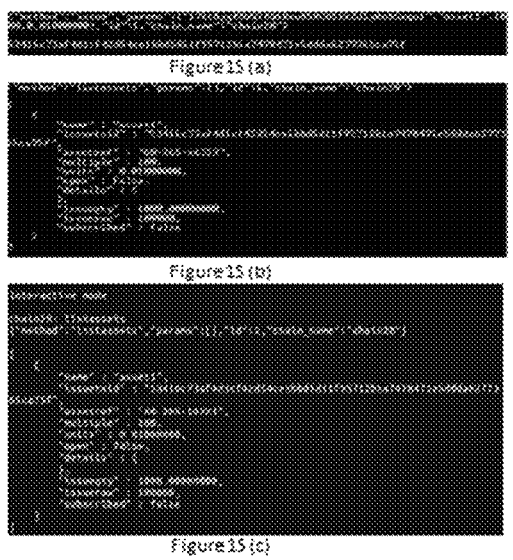
Figure 15 (a)
Figure 15 (b)
Figure 15 (c)
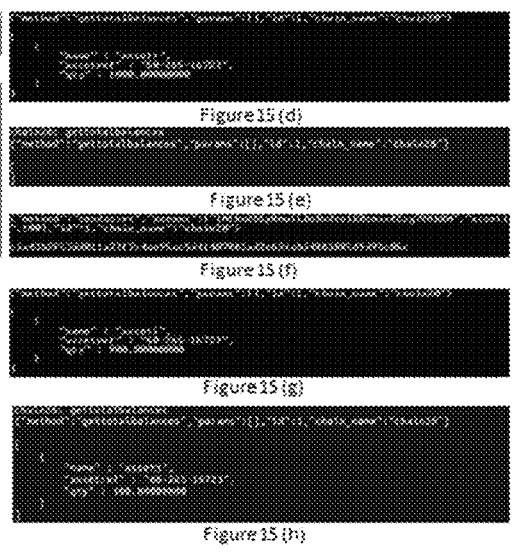
Figure 15 (d)
Figure 15 (e)
Figure 15 (f)
Figure 15 (g)
Figure 15 (h)

 
Figure 16(g)c  Figure 16(h)

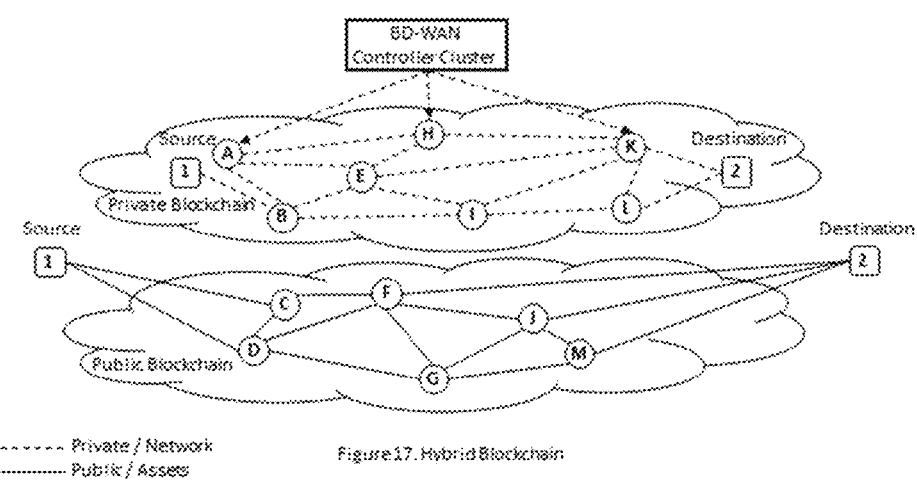
Figure 17. Hybrid Blockchain

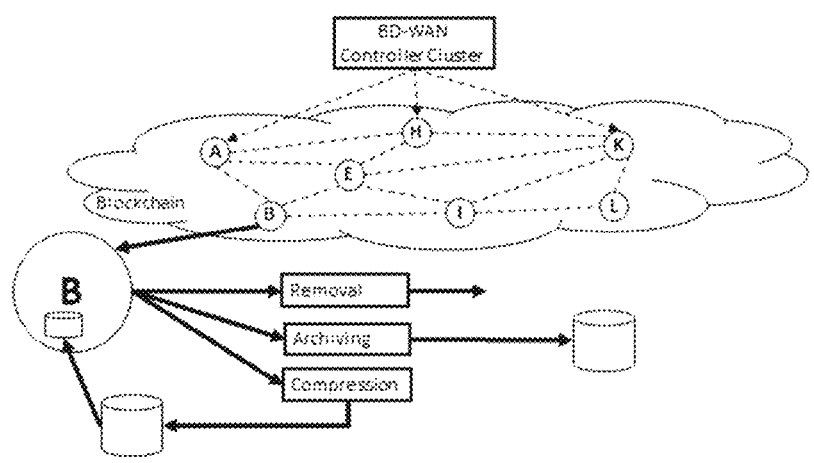
[Figure 18] Blockchain Growth Management

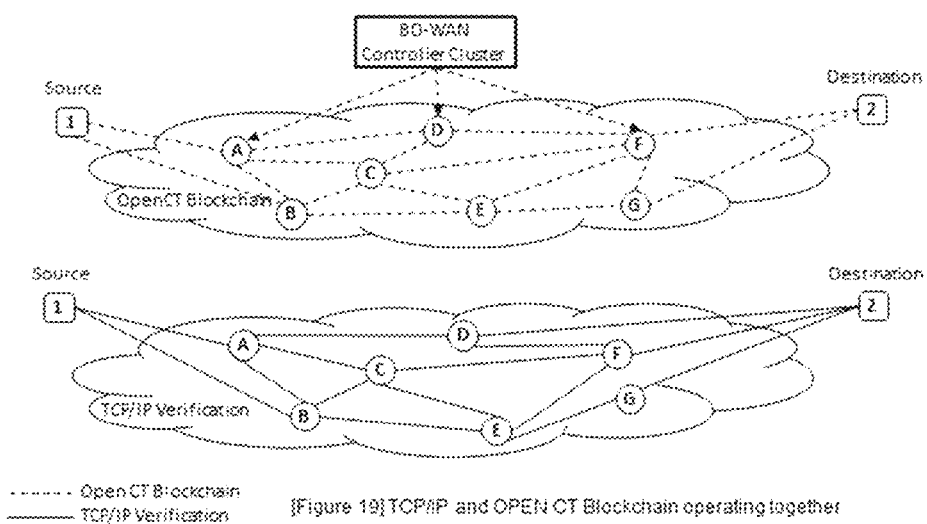
[Figure 19] TCP/IP and OPEN CT Blockchain operating together

Figure 20. BaaT Protocol vs. data transport protocols

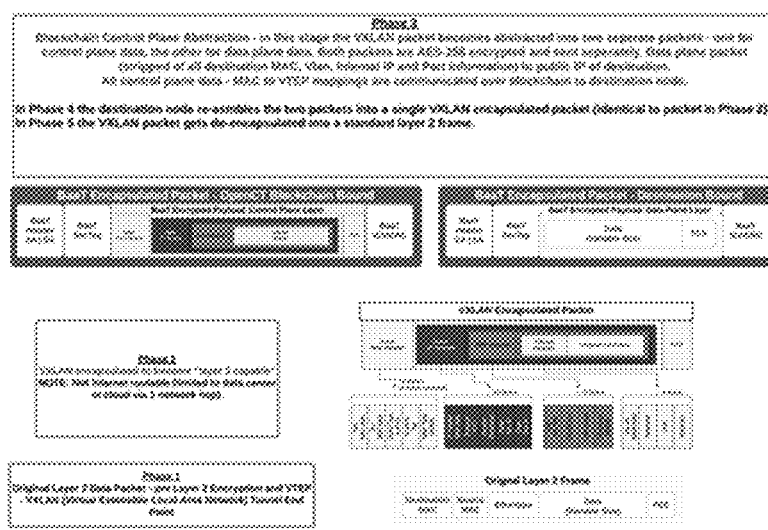
[Figure 21] Governance

|  | Pre-Token Crowdsale | Token Crowdsale | Reserve | Miner Reward |
| --- | --- | --- | --- | --- |
| % from the maximum supply of Tokens | 10% | 40% | 35% | 15% |
| Number of Tokens available | 25,000,000 | 100,000,000 | 87,500,000 | 37,500,000 |

Figure 22   Token Distribution

[Figure 25] The OCT rewarding system

[Figure 26] The OSI Model

Fig 27 - SD WAN Logical Diagram

|  | Year-1 | Year-2 | Year-3 | Year-4 | Year-5 | Total |
|---|---|---|---|---|---|---|
| Start number of Reward Tokens per Year | 7,000,000 | 6,500,000 | 6,000,000 | 5,500,000 | 5,000,000 | 30,000,000 |
| Annual Profit (%) | 30 | 26 | 22 | 16 | 12 |  |
| Number of Reward Tokens - Simple Profit | 9,100,000 | 8,190,000 | 7,320,000 | 6,380,000 | 5,600,000 | 36,590,000 |
| Number of Reward Tokens -- Compound Interest - Jacob Bernoulli | 9,449,012 | 8,430,046 | 7,476,460 | 6,454,310 | 5,637,484 | 37,447,312 |
| Number of Reward Tokens - Compound Interest - Quarterly (n=4) | 9,348,284 | 8,362,031 | 7,432,948 | 6,434,222 | 5,627,544 | 37,205,029 |
| Number of Reward Tokens - Compound Interest - Weekly (n=52) | 9,440,869 | 8,424,586 | 7,472,992 | 6,452,724 | 5,636,705 | 37,427,876 |
| Number of Reward Tokens - Compound Interest - Daily (n=365.25) | 9,447,848 | 8,429,266 | 7,475,965 | 6,454,084 | 5,637,373 | 37,444,536 |

Figure 28

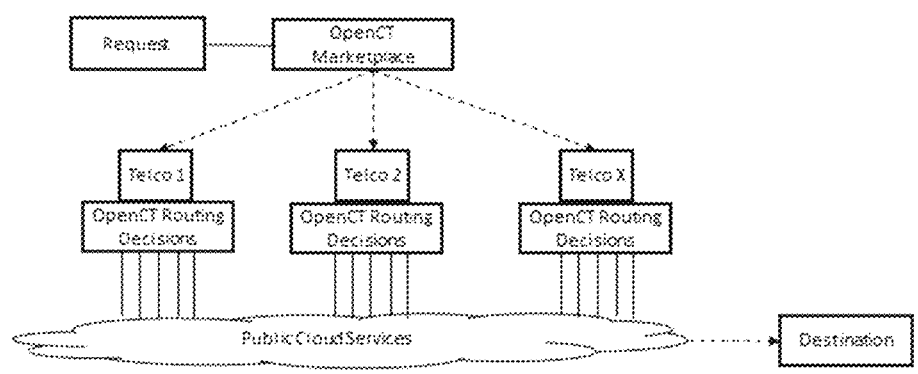
Figure 29. OpenCT Marketplace - Bandwidth

UBIQUITOUS, INDUSTRY AGNOSTIC PLATFORM FOR AUTOMATED, SMART CONTRACT BASED, REAL TIME TRUSTED TRANSACTIONS

CROSS REFERENCE TO RELATED APPLICATION

This application claims priority from provisional application Ser. No. 62/801,692 filed on Feb. 6, 2019.

FIELD OF THE INVENTION

The present disclosure relates to a network platform for high volume transactions requiring verifiable transaction tracking.

BACKGROUND

Various industries require access to trusted ledger applications to provide verifiable accounting for their services. Many industries are highly inefficient, sometimes preventing business flow. Blockchain has been identified as a trusted public ledger platform to allow services to be developed cost effectively to produce new economic optimizations, thereby improving performance and reducing cost of services. However, even Blockchain has its own inherent inefficiencies, requiring massive processor and large amounts of energy to compute a given transaction where the payout for the transaction can be more expensive than the transaction itself. Additionally, Blockchain is limited in the number of transactions per second they can manage, for example, in some cases transactions can take 10 minutes. For real time high transaction rate applications, this type of Blockchain will not work. Moreover, individual industries, industry segments or Markets have their own inherent issues, e.g., as follows for the identified industries.

SCOPE AND SUMMARY OF DISCLOSURE

Telecommunications—To transmit data across large distances, for example across oceans, telecommunications companies acquire a data pipe based on their expected utilization of data for their businesses. Telecommunications customers must purchase more than the peak of their expected usage, causing inefficiencies and over-purchasing of bandwidth with long term contracts. A Market utilizing the techniques of the presently disclosed subject matter will leverage the Blockchain as a ledger for tracking bandwidth usage at a granular level, allowing for an efficiency in selling parts of a pipeline, instead of the entire pipeline itself.

Use cases in the Finance area taking advantage of the techniques of the presently disclosed subject matter are, e.g.,—A) leveraging Blockchain for greater speed and efficiently proving the order of electronic trades within a dark pool. B) leveraging Blockchain to support the ability to decrypt what under normal conditions are anonymous trading activities within a dark pool (decryption as needed for example during a SEC investigation or regulatory mandated audit of trades). C) lower cost for global remittances. D) LBG (Load Balancing Gateway) to support Enterprise Network exchange services—a "router" that can route or exchange between tokens. Ultimately in support of a network that requires a specific utility token for operations but needs to 1. build a reserve (based on ANY other token or fiat) to ensure smooth transactional activity and 2. provide liquidity for the native token regardless of the form of payment provided by enterprise clients.

Use cases in the Artificial Intelligence (AI) area include, e.g., OpenCT's LBG (Load Balancing Gateways)—providing access to both transport services; financial exchange services; and inexpensive compute power from shared compute providers and/or farms and/or mining platforms.

Use cases in the Healthcare area include, e.g.,—leveraging Blockchain to provide an immutable ledger of cloud based patient medical records that are owned and managed by patients (or their designated medical representatives/doctors) with the ability to provide secured access on an as-needed basis to others. A benefit for patients is in terms of the patient's responsible ownership of health and a benefit to insurance operators is in allowing them to verify and audit this ledger to make more granular decisions with regard to coverage benefits (and thus lowering costs on a wider scale based on more accurate information).

Use cases in the Energy area include, e.g.,—leveraging Blockchain for in immutable ledger that supports multiple overlays of disparate data sources that when combined provide more accurate information (from different divisions within an enterprise; OR different independent enterprises who agree to collaborate) regarding upstream exploration, abstraction, production and midstream storage or transport and downstream refinery and distribution.

Use cases in the Supply Chain area include, e.g.,—leveraging Blockchain to create efficiencies in the ordering, manufacturing and logistics processes of large scale global entities.

Use cases in the Real Estate area include, e.g.,—leveraging Blockchain in support of A) Tracking of land title rights; B) tokenization (and greater liquidity) of real estate assets.

Use cases in the Intellectual Property area include, e.g.,—leveraging Blockchain to support tracking, distribution, and liquidity (via tokenization) of IP.

Use cases in the Cryptocurrency area include, e.g.,—OpenCT Proof of Trust (PoT), discussed herein, which can provide variable transaction requirement reducing the processor and energy demands of encrypting and decrypting cryptocurrency transactions without losing security or Blockchain based tracking.

Described herein is the Open Crypto Trust ("OCT" or "OpenCT") Platform. The OCT framework facilitates the creation of attributes and rule sets required for industry specific applications. The OCT framework envisions/enables the implementation of systems utilizing defined metrics with configurable thresholds that can trigger transactions—such as self-executing smart contracts—that can be tailored to the security, regulatory, and legal standards of any industry.

Described is Blockchain as a Transport (BaaT) networking architecture. BaaT connects geographically dispersed Layer 2 (L2) islands over any available infrastructure, including the public Internet. BaaT securely supports all kinds of network traffic including Unicast, Multicast, and Broadcast.

Described is Blockchain-Defined Wide Area Networks (BD-WAN) software framework integrating Blockchain with Software-Defined WAN (SD-WAN) for a secure, scalable virtualization of WAN transport technologies.

Described is the OCT platform utilizing a Proof of Trust (PoT) Mining Algorithm as one of two algorithms for distributed low compute power distributed secure Blockchain mining for allowing low stakeholders the opportunity to produce blocks over the OCT platform and hence get rewarded for their efforts.

Described is OCT Token Crowdsale allowing for an increasing linear function to increase the value of tokens over time.

BRIEF DESCRIPTION OF DRAWINGS

The description of the various example embodiments is explained in conjunction with appended drawings, in which:

FIG. 4 shows typical enterprise WAN solutions.

FIG. 5 shows value SD-WAN services under a centralized control plane in an Enterprise VPN illustrated via a Hub/Spoke arrangement.

FIG. 6 shows the benefit of BD-WAN utilizing BD-WAN Controllers, BD-WAN Units, BD-WAN Cloud, CPE and LBG.

FIG. 7 shows BD-WAN Controller interoperation with the BD-WAN Unit from the Initial State.

FIG. 8 shows a Steady State where the counters are about to expire on the BD-WAN Controller.

FIG. 9 shows another Steady State where the timers are about to expire on the BD-WAN units.

FIG. 10 illustrates Interrupt handling.

FIG. 11 illustrates Conflicts handling on the BD-WAN Controller.

FIG. 12 shows Hexadecimal Text Conversion.

FIG. 13 shows The OpenCT platform Reward System encompassed by the present disclosure.

FIG. 14 shows exemplary Blockchain propagation within the scope of embodiments of the invention described herein.

FIGS. 15(a)-(h) show exemplary Asset Creation and Transactions used in embodiments of the invention described herein.

FIGS. 16(a)-(h) show examples of Data Storage and Retrieval described herein as manifested by exemplary implementations of the inventive system and method.

FIG. 17 shows an example of a Hybrid Blockchain described herein as manifested by an exemplary implementation of the inventive system and method.

FIG. 18 shows an example of Blockchain growth management consistent with the present disclosure.

FIG. 19 shows TCP/IP and OpenCT Blockchain operating together in an embodiment of the invention described herein, including the logic of a packet in a BaaT/BD-WAN network.

FIG. 20 shows a comparison of BaaT Protocol to other well-known data transport protocols including TCP.

FIG. 21 shows Layer 2 Encrypted BaaT Encapsulation Data Flow in support of VXLAN.

FIG. 22 shows the contemplated finite maximum number of OCTb tokens of 250,000,000 and their distribution.

FIG. 28 shows tabulations resulting from computations involving the decrease in the fixed number of assigned reward tokens year over year, as well as the annual profit, in an embodiment of the described invention.

FIG. 29 shows an exemplary embodiment of the OpenCT Marketplace described herein focused on Bandwidth transactions.

DETAILED DESCRIPTION

OpenCT Platform (Blockchain)

Figure 1:
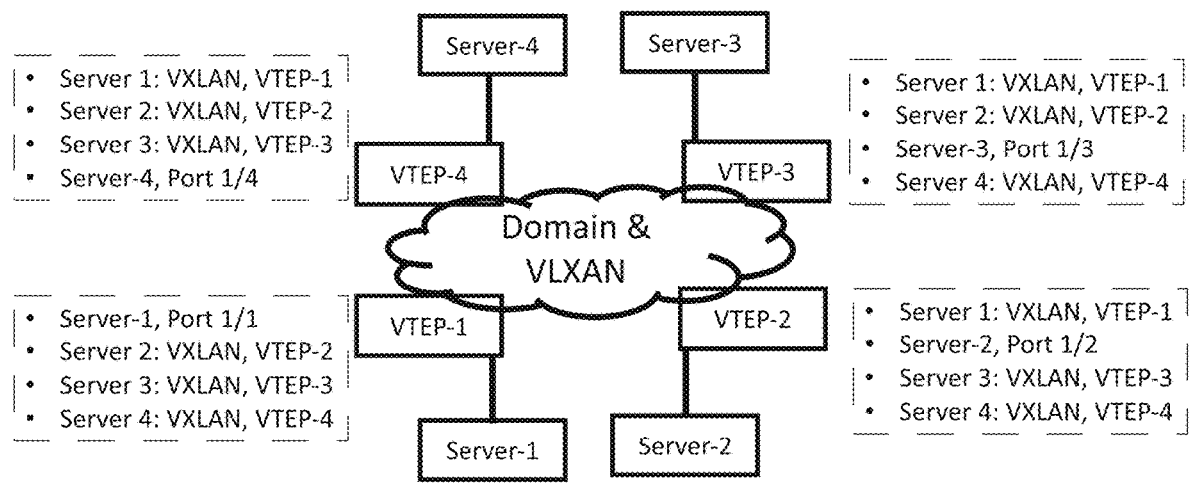
FIG. 1 illustrates the achievement of control plane operation via Blockchain.

The Blockchain system is used for the control plane, instructions, reporting, and auditing in real time. FIG. 14 shows exemplary Blockchain propagation. There is no need for network propagation—the Blockchain maintains a continuously updated state for the network.

The BD-WAN Controller Cluster tracks the health status of all nodes A through M in the network and propagates routing tables to all nodes. In regard to Blockchain, all nodes (A through M) in the Blockchain receive regular routing information updates very quickly (currently clocked at 250 ms). This rate will change based on the needs and capabilities of the network. The Blockchain-related processing time is the total propagation speed of node update and is based on the mesh of the network and propagation. Blockchain keeps only networking propagation information, not the data itself.

When transmitting information from Source "1" to Destination "2", a network route will be sent to nodes A-M from the BD WAN Controller Cluster. Controlled nodes already have the optimal route(s) determined. In the use case of Inbounds Success, nodes in the Blockchain routing are processing updates properly. In the use case of Node Failure, a message is sent to the BD-WAN Controller Cluster to have it update the routing table and put the new routing table in the next update for the route. When that node returns to full use, it will be put back into the routing table. The processing at the node includes decrypting the routing table and is near zero in time. This is useful for streaming applications where network interruptions cause a breakdown in quality of service. It provides an improvement in delivery QOS for streaming. TCP/IP and UDP, etc. are still necessary, but TCP does not need to be the only technology.

FIG. 15 shows exemplary Asset Creation and Transactions. FIG. 15 (a) Assets can be created from any node in the Blockchain. By way of example, the system and technique disclosed herein can create a new asset named "asset1" with 1000 units, each of which can be subdivided into 100 parts and send it to itself. FIG. 15 (b) shows verification that the new asset named "asset1" is created and listed successfully. FIG. 15 (c) shows inspecting from another node attached to the same Blockchain. FIG. 15 (d) shows checking the balance of the created asset on the originating node—it is 1000 (the full balance). FIG. 15 (e) shows checking the balance of the created asset on the other node. It should be zero (no output meaning no balance has ever been transferred to this node at this point in time). FIG. 15 (f) shows sending 100 units of the created asset from the originating node to the other node. FIG. 15 (g) shows checking the new balance on the originating node (it is now 900 after deducting the 100 units just sent out). FIG. 15 (h) shows checking the new balance of asset from the other "receiving" node (it is the 100 units just received).

FIG. 16 is an example of Data Storage and Retrieval described herein as manifested by an exemplary implementation of the inventive system and method. FIG. 16 (*a*) shows creation of a stream on a source node. FIG. 16 (*b*) shows published information on the created stream (a key and some hexadecimal data). Note that the chosen hexadecimal data "637573746f6d65722031353520766e6964203130343030" is not random. It has some meaning. This demonstrates the entry of the hexadecimal data. FIG. 16 (*c*) shows inspecting the created stream from another node attached to the same Blockchain. Note the number of keys (1) in stream100. FIG. 16 (*d*) illustrates digging deeper and fetching more detailed information regarding the keys inside stream100. It can be seen that key1555 contains "1" item (the published hexadecimal data). FIG. 16 (*e*) shows publishing other hexadecimal data item(s) from the other node. FIG. 16 (*f*) shows "637573746f6d65722031353533520766e6964203132-353030" on the same stream and key pair (stream100, key1555). FIG. 16 (*g*) shows inspecting the stream from the source node. FIG. 16 (*h*) shows digging deep into stream100. Stream100's keys (key1555) as well as the key contents (2 items) can be seen. These are the two hexadecimal data items published.

FIG. 17 is an example of a Hybrid Blockchain described herein as manifested by an exemplary implementation of the inventive system and method. Such a Hybrid Blockchain can be either public or private, or both. Public is used for documents/money/digital assets. Private is used for network propagation. Block producers handle all Blockchain blocks.

FIG. 18 shows an example of Blockchain growth management consistent with the present disclosure. Blockchain node B (and all nodes in the Blockchain) uses a combination of removal, compression, and archiving to manage the Blockchain stack size on the node. FIG. 18 illustrates removal/compression/archiving.

Removal may be by Expiration Date. The system will reduce the Blockchain stack based on the type of data stored in the Blockchain—removing data with an expired expiration date. For example, for illustrative purposes, removal may occur due to the fact that network routing information may not be useful within 1 second of its propagation, legal documents could have a 5 year expiration date (end of contract), money has no expiration date (exists forever), Nodes in the Blockchain do not carry the entire Blockchain Ledger, a lightweight version of a wallet only carries the header.

Compression involves compression of Blockchain entries. Compressed ledgers are compared as if they were standard Blockchain ledgers. Metadata is the only thing saved in the Blockchain, and each element of metadata represents section(s) of the chain. There is absolute finality—, i.e., there is no period of uncertainty in the compression Blockchain. Once the chain is built, there is no period of negotiation. Convergence is final, it does not require contesting, or back and forth of information. All routing information is sent to the nodes simultaneously.

With archiving, Blockchain ledgers are archived off the node to enable the node to continue to function when they exceed a certain size limit. Nodes that carry the full uncompressed chain are archived. Compromised nodes are validated against. Routing data is flushed, revalidated, and updated once again. In case of compromised data, the node is flushed, and treated as a new node, built up from scratch, and comes on line as if it were just added to the network. The compromised node gets put on a watch list to track against Proof of Trust.

The Features/Benefits of such a system/arrangement include that efficiencies result. Much more transactional activity can be captured/acted on. There are much lower maintenance requirements. Much less network bandwidth is required. Re-transmission of packets (aka TCP/IP) is not necessary. TCP/IP is used to guarantee payloads. Uses less energy. Uses less computational power. Faster streaming media using no TCP/IP for data transmission allowing exponential growth in media streaming clients. Broadcast routing tables allow streaming media to be delivered to the client including any node loss along the routing path due to the inability of a human to perceive a routing table update drop in audio or video. Such an approach is more reliable than TCP/IP Routing for transmission of data. Speed and efficiency of data transport for internet access is provided. The system also results in Convergence. There is a need to flood an environment with news about a bad route. Once a bad route appears, the entire network must know that a route is no longer valid. Once a route is found to be invalid, it is important to identify what is the next valid route. These are eliminated with OpenCT as described herein. If any route is found to be invalid, the system or method of the present disclosure and/or invention immediately updates the entire network with the new route. No local calculation is required.

FIG. 19 shows TCP/IP and OpenCT Blockchain operating together, including the logic of a packet in a BaaT/BD-WAN network. BD-WAN Device broadcasts routing data to OpenCT Blockchain routing nodes every N ms (for example, every 250 ms). Nodes A-G and Source/Destination 1 and 2 receive routing data from BD-WAN. Header information and payload are published from point A to point G and Source/Destination 1&2 using the OpenCT BaaT network. Payload in BaaT is verified by Baat using Header information. If BaaT verification fails, payload is requested again. TCP/IP used to verify that the whole package arrived and is complete to fit in with TCP/IP networks. If TCP/IP verification fails, payload is requested again.

Figure 27:
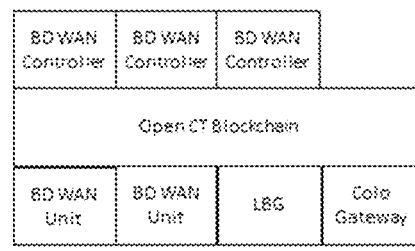
FIG. 27 shows a BD-WAN Logical Diagram which encompasses embodiments of the invention described herein illustrating an exemplary OpenCT Blockchain BD-WAN Controller.

FIG. 27 is a BD-WAN Logical Diagram showing an exemplary OpenCT Blockchain BD-WAN Controller. With regard to Routing Protocol vs. Propagation Protocol, Routing protocol is a subset of OpenCT propagation protocol. It is a more efficient routing protocol. Provides greater stability and is steady state.

Components of failure include Failure Detection (standard), Failure Propagation (standard), and New Path Calculation (unique). The time reduction provided by the inventive approach is reduced from minutes to 250 ms (near instantaneous).

The presently described system offers many features, advantages and benefits of EOS Blockchain, but there are significant differences. With EOS, UTXO is involved, i.e., proof that someone has shared an amount of currency. OpenCT Blockchain is concerned with the metadata that is stored and that it is retrievable, not the transaction of a currency as with EOS. OpenCT operates in a manner similar to EOS in regard to execution of smart contracts. May use IPFS protocols. OpenCT involves storing the metadata about a network transfer rather than the data that was transferred. Typical Metadata may involve Source, Destination (for addresses), Payload type/traffic type, VLAN ID, QOS, MPLS Header fields, Open FLOW Headers.

Figure 20:
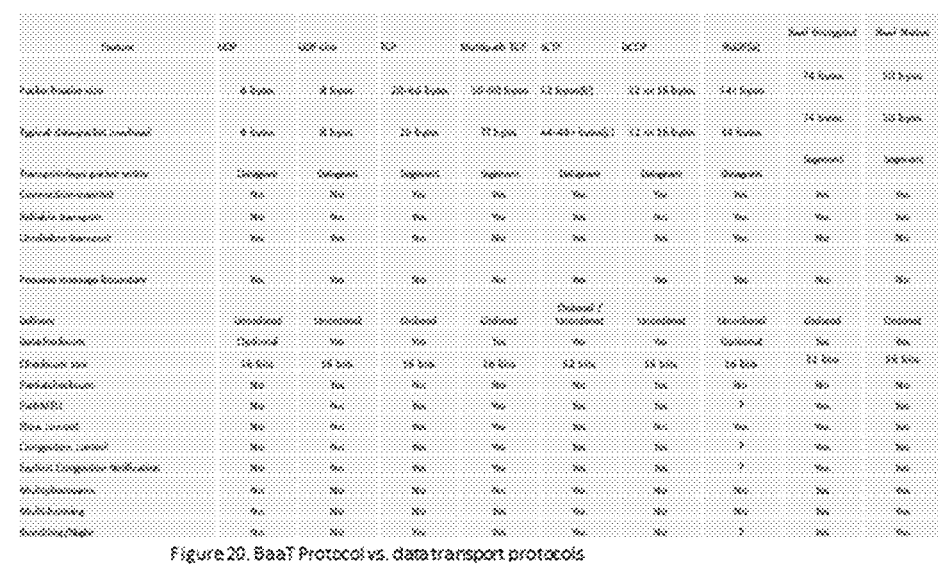

Blockchain and distributed ledger are used in support of Routing of Data Packets—a mechanism for how nodes receive routing of data packet information. They are also used in support of Smart Contracts—scaling up and scaling down of a circuit and tying that to a smart contract, i.e., real Time billing, bandwidth on demand and an Immutable Record. They are also used in support of Data Transport Layer Functions. Provides extension of VXLAN by leveraging Blockchain/distributed ledger to extend the reach of VXLAN. A necessary component for the data transport layer is that it handles Routing and Data transport services. FIG. 20 provides a comparison of BaaT Protocol to other well-known data transport protocols including TCP. The smart contract component involves monitoring the level of data held within the Blockchain and how OpenCT achieves bandwidth on demand. FIG. 21 shows Layer 2 Encrypted BaaT Encapsulation Data Flow in support of VXLAN. VTEP is VXLAN (Virtual Extensible Local Area Network) Tunnel End Point. Shown is Phase 1 Original Layer 2 Data Packet—pre Encryption and VTEP-VXLAN (Virtual Extensible Local Area Network) Tunnel End Point. This is the traditional layer 2 frame that would traverse a LAN environment. Phase 2 VXLAN is encapsulated to become "layer 3 capable." This is a standard layer 3 packet leveraging VXLAN protocol. It includes the creation of a VTEP (VXLAN Tunnel End Point). Note that this is not Internet routable (limited to data center or cloud via 1 network hop). In the Phase 3 stage, three things are happening: (1) Blockchain Control Plane Abstraction—the VXLAN packet becomes abstracted into two separate packets—one for control plane, the other for data plan, (2) BaaT Encryption—both packets become AES-256 encrypted, (3) BaaT Encapsulation—both packets become the basis for a new layer 3 packet (now Internet routable). The data plane packet (all "envelope" information has been stripped—all destination MAC, Vlan, Internal IP and port information) gets routed to public IP of destination. All control plane data ("envelope") and MAC to VTEP mappings are BaaT encapsulated and routed over blockchain to the destination node. In Phase 4, the destination node reassembles the two packets into a single VXLAN encapsulated packet (identical to packet in Phase 2). In Phase 5, the VXLAN packet gets de-encapsulated into a standard layer 2 frame. Node State Advertisements (NSA) Link State Advertisements (Gossip Protocol). This supports the ability to eliminate the chatter that is necessary to determine consensus. It also sustains relevance to how the network should be organized. The system can hash how that node would react when given an option for decisions. The system can determine what any node would vote on based on what that node knows about the NSA.

Blockchain as a Transport (BaaT)

BaaT is useful for any critical high-frequency trading application as described above. These applications require many events and transactions to be recorded over the Blockchain while at the same time ensuring maximum stability, scalability, security, and requiring the fastest convergence time.

BaaT solves many of the disadvantages of other overlays by integrating Blockchain with Virtual Extensible LAN (VXLAN). VXLAN was originally drafted as an overlay technology that can work without a control plane. It has proven to be an overlay of choice, but its scope is normally limited to a single data center or cloud.

BaaT greatly enhances the operation of VXLAN by adding a control plane component to it, and extending the VXLAN working domain beyond the boundary of a local data center or even a public cloud.

BaaT operation across the public Internet is appealing as a viable WAN option for many network operators such as enterprises, service providers, and telcos in front of conventional, expensive WAN options such as dedicated links, MPLS, or Virtual Private Networks (VPNs).

BaaT achieves control plane operation via Blockchain. See FIG. 1. In this mode, the VXLAN Tunnel Endpoints (VTEPs) are also nodes of a public or private Blockchain that can span the public Internet.

Figure 2:
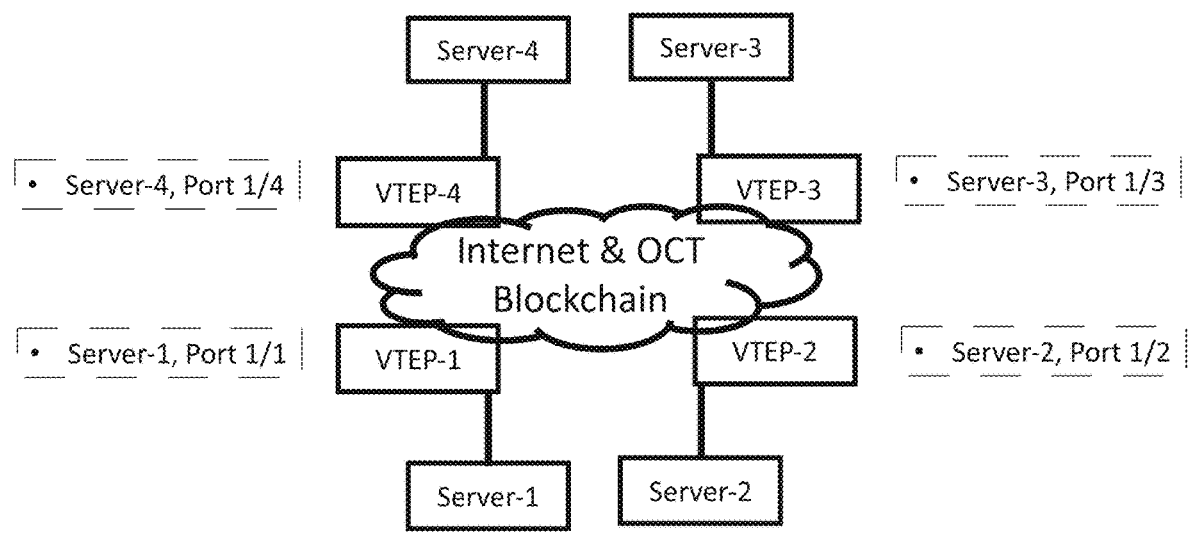
FIG. 2 illustrates VTEPs learning the local MAC addresses via their local ports.

The local MAC learning technique is the same as with any other VXLAN operation: The VTEPs learn the local MAC addresses via their local ports, as shown in FIG. 2: BaaT Initial State, and then the addresses are advertised/published as reachable through their VTEP IPs over the Blockchain using transactions that are packed into proper blocks.

Steps to publish a stream of hexadecimal data over the Blockchain are as follows: i. VTEP Converts Alphanumeric Text to Hexadecimal Text, ii. VTEP publishes the Hexadecimal Text over the Blockchain, iii. The other recipients VTEPs retrieve the Hexadecimal Text from over the Blockchain and convert it back to Alphanumeric Text, iv. The recipient VTEP uses this data for further communications with all other VTEPs.

Example

Customer #1555 LAN segment is connected to VTEP-1 (in FIG. 2), VTEP-1 needs to participate in VXLAN with VNID 10123. VTEP-1 just learned the Media Access Control (MAC) address (00-14-22-01-23-45) from one of the locally attached servers belonging to Customer #1555 (Server-1 attached to Port 1/1).

The VTEP-1 IP address is 10.1.1.178, and this is the IP address that other VTEPs need to use to reach VTEP-1. The message that will be published from that VTEP over the Blockchain is typically a MAC-to-VTEP mapping message that also includes the Customer ID as well as the VNID.

VTEP Converts Alphanumeric Text to Hexadecimal Text. From Alphanumeric Text: 'customer 1555 vnid 10123 mac address 00-14-22-01-23-45 VTEP 10.1.1.178'. To Hexadecimal Text: '637573746f6d65722031353-53520766e6964203130313233206d61632061646472265-73732030302d3134 2d32322d30312d32332d34-35205654455502031302e312e312e313738'.

VTEP Publishes Hexadecimal Text to Blockchain.

VTEPs see the Blockchain Hexadecimal Text and reads them back to all VTEPs.

VTEPs Convert Hexadecimal Text to Alphanumeric Text. From Hexadecimal Text: '637573746f6-d6572203135353520766e6964203130313233206d6163-206164647265737320303 02d31342d32322-d30312d32332d34352053205654455502031302e312e312e3-13738'. To Alphanumeric Text: 'customer 1555 vnid 10123 mac address 00-14-22-01-23-45 VTEP 10.1.1.178'.

Figure 3:
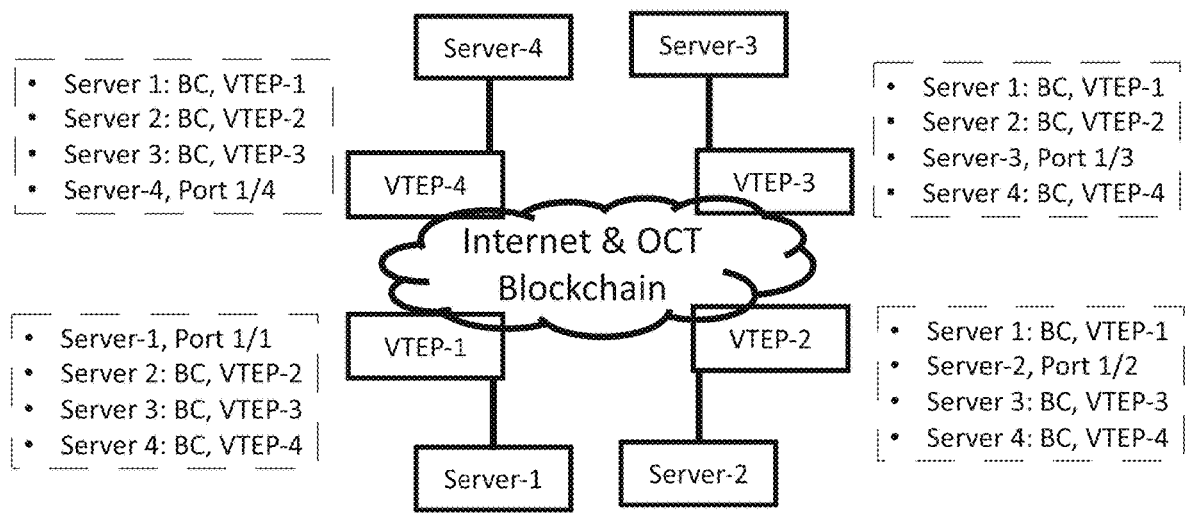
FIG. 3 illustrates that different MAC-to-VTEP mappings are distributed over the Blockchain to all participating nodes/VTEPs, as the final state.
Figure 12:
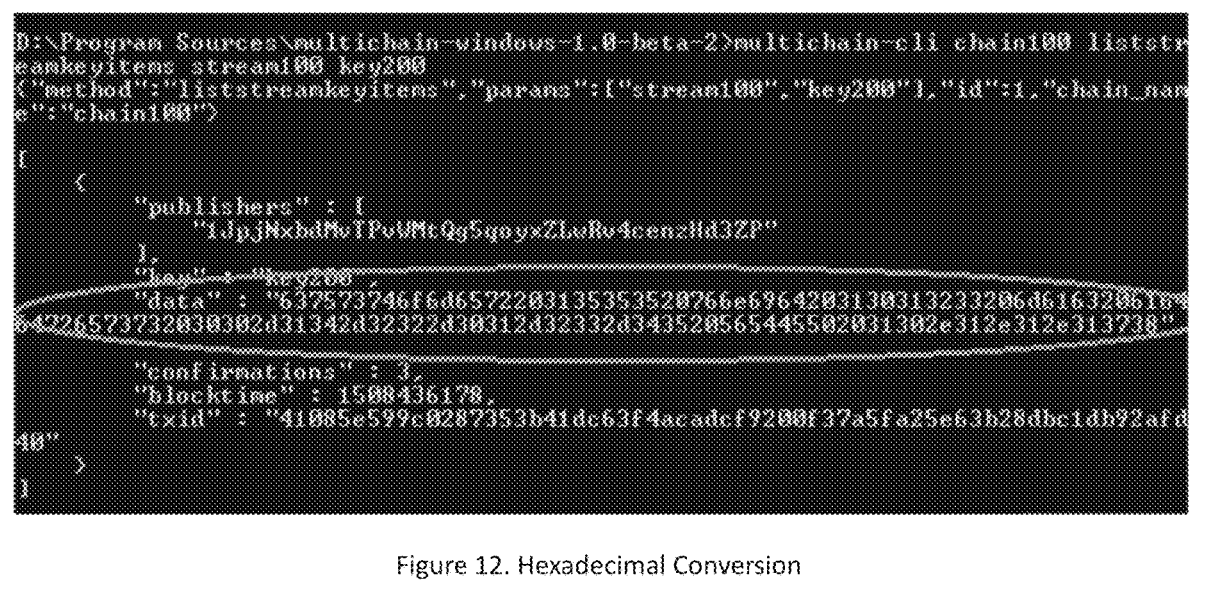
Figure 16A:
Figure 16B:
Figure 16D:
Figure 16C:
Figure 16E:
Figure 16F:

FIG. 12 shows Hexadecimal Text Transmission. This message can be seen by all VTEPs participating in the Blockchain but only those VTEPs that are interested in Customer ID 1555 and VXLAN VNID 10123 will use this message, translate it, and add its content to their local copy of the MAC-to-VTEP mappings. Because the different MAC-to-VTEP mappings are distributed over the Blockchain to all participating nodes/VTEPs, as the final state shown in FIG. 3. No data-plane learning is required for unknown unicast MAC addresses. No IP multicast underlay is required. This is why BaaT can span beyond the boundary of a data center or cloud to the public Internet. Because of the distributed nature of Blockchain, no significant delay is expected between the different nodes. For the broadcast and multicast traffic, the head-end replication is always the solution as in other control-plane-based VXLAN modes.

Background of BaaT

Provides seamless operation across any IP transport network including the global public Internet. BaaT is an advanced L2VPN solution for both enterprises and telco/service providers, with which an organization can leverage the public Internet for their WAN traffic so that they don't need to share traffic with their upstream providers as in the case of MPLS VPN service or even modern SD-WAN. Current physical or virtual devices support VXLAN and can accommodate the Blockchain software. Unlike other tunneling techniques, BaaT is built to operate in a multipoint fashion. Its signaling is done separately via the Blockchain and it has no scalability issues. No unknown unicast entry is to be found on any VTEPs; it is either a unicast MAC address match, advertised over the Blockchain, or a default entry toward the VXLAN gateway. Multicast and broadcast traffic is handled via the head-end replication on the source VTEP to all other known VTEPs in the same VXLAN. The list of VTEPs is known—and always updated—over the Blockchain.

BaaT VPN provides Security (Intranet/VPN). Baat VPN leverages cryptography to encrypt data in the pipe and decrypt at the remote end. Thus, if anyone were to be able to intercept a payload of data, it would be encrypted. Control Plane Security is all performed by the Blockchain itself. Native security is built into Blockchain. VXLAN Security Field may be used. This is a security layer no other approach is using today. This is a field in the VXLAN header that OpenCT currently uses. Encode VN ID in this security field. The node will discard the packet if this field is zero. Data Plane Security involves Encryption/Decryption.

Figure 26:
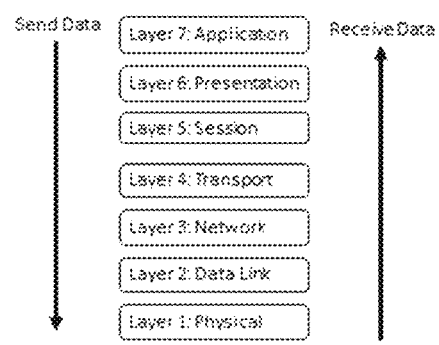
FIG. 26 shows a Layer 2 (Data Link) VPN which is a Carrier Grade Secure BaaT.

FIG. 26 shows Layer 2 VPN. The Layer 2 (Data Link) is a Carrier Grade Secure BaaT. BaaT leverages OpenCT Blockchain to create an architecture that connects geographically dispersed layer-2 islands over any available infrastructure including the public Internet. BaaT enhances the operation of VXLAN overlay networking technology by adding a control plane component to it and extending the VXLAN working domain beyond the boundary of a local data center or public cloud. BaaT provides unique security strength. Control and data planes are abstracted from the packet and each use a different encryption standard—SHA-256 for control plane and AES-256 for data plane. Leverages cryptography (SHA-256) to create layer 2 tunnel endpoints (across the public Internet)—thus making encrypted tunnels that are invisible from a layer 3 perspective where hackers operate. It is impossible to see the control plane data from an IP perspective or from an IP packet perspective. Private IP addresses and the associated VLANs for tunnel endpoints are encrypted via SHA-256. The only way to "participate" in a conversation is to be an authenticated node on the blockchain—via verified MAC address database. Nodes in the network know about each other, and nodes not in the BaaT network cannot see the nodes in the network. Provides military grade end-to-end data encryption with negligible bandwidth tax on performance—2% instead of standard of 20%.

BaaT scalability is superior to other tunneling techniques as it was built to operate in a multipoint fashion. Its signaling is done separately via OpenCT Blockchain and it has no scalability issues. BaaT is an advanced L2 VPN solution for enterprises, governments, and telco/service providers, with which the organization can leverage the public Internet for their WAN traffic so that they don't need to share traffic with their upstream providers as in the case of MPLS VPN service or even modern SD-WAN. BaaT securely supports all kinds of network traffic including; Unicast, Multicast, and Broadcast. BaaT treats the global Internet as a very big switch so that the environment leveraging BaaT remains like a switched environment although it may span the globe.

Enterprise VPN is illustrated via the Hub/Spoke arrangement shown in FIG. 5. This is Multi Point (multiple locations connected to each other). Facilitates secure transactions between facilities. Using Blockchain as the security for the Units increases security of the components in the network.

Layer 3 Consumer BaaT (crypto VPN) is a Blockchain based, cryptographically secured VPN. Appropriate for Global Road Warriors. Downloadable to your smartphone, could be used like any VPN today, military grade data encryption (AES-256), control plane layer abstraction (handled via OpenCT Blockchain) ensures port level details are obfuscated. Port-level obfuscation ensures inability for BaaT crypto VPN to be "blocked". Connect with discrete servers globally and appear as if they are in a different geographic area with no indication of port type activity (video streaming, file transfer, SMTP, etc.). Usable on phone, tablet, PC,—using an application.

Description of Blockchain-Defined WAN (BD-WAN)

BD-WAN is based on the well-known Software-Defined WAN (SD-WAN) architecture but with fine tuning and Blockchain engagement. The BD-WAN architecture resulting from the integration of Blockchain with SD-WAN enables improved WAN services and secure Internet connectivity, making it competitive with more legacy WAN technologies such as dedicated links or MPLS. In some cases, it uses inexpensive Internet broadband connections to replace more expensive solutions.

BD-WAN Architecture components include a BD-WAN Controller: An SD-WAN controller that is northbound controlled via Blockchain. Further components include BD-WAN Units: Customer Premises Equipment (CPE) installed to which the local WAN resources are directly connected (leased line, public internet, MPLS, wireless, satellite, etc.). A further component is the Global Blockchain: In the BD-WAN, this is the OpenCT platform. The BD-WAN Controller and the BD-WAN units join the OpenCT Blockchain. A further component is a Load Balancing Gateway (LBG): a device that sits within the premises of partner networks. A further component is the BD-WAN Secure Cloud: The interconnection with selected Public Clouds as well as Content Providers. BaaT allows for the secure communications between BD WAN Controller and BD WAN Units.

Comparing typical enterprise WAN solutions as shown in FIG. 4 to the value SD-WAN services under a centralized control plane as shown in FIG. 5, we see the benefit of BD-WAN utilizing BD-WAN Controllers, BD-WAN Units, BD-WAN Cloud, CPE and LBG as shown in FIG. 6.

The main features of the BD-WAN offerings include trusted per-usage billing that is verified and hard-coded over the Blockchain. This is a Service being delivered to international carriers. AT&T has something for small business under 500 Mbit which is possibly just bandwidth throttling. But the BD-WAN offerings are multi-gig solutions. They monitor application traffic. Based on what is needed against a threshold, a new smart contract is given, and a new request is made for a new lambda (optical network). Uses predictive measures of the application to add optical lambdas. Works on the down side as well, turning off channels as necessary. Each Blockchain based smart contract is the pricing index against the channels that are added or subtracted. All of this is automated, with no human interaction. Network intelligence allows and enables increase to the bandwidth, and decreases in reverse. This is true bandwidth on demand. A customer consumes what is needed, and pays for only what is used. A further feature is the ability to establish and tear down logical as well as physical circuits, allowing the customers to pay only for what they consume—no flat fee—as well as minimizing international connectivity costs. This benefit is especially important when considering the high costs of trans-oceanic links, while allowing customers to scale up or burst connectivity during times of peak demand. Further features involve integrating Blockchain with legacy technologies. For example, Inter-Domain MPLS traffic engineering can now be done via Blockchain. A further feature is full visibility and control over all transport facilities either via Fiber to the Premises (FTTP) or via partnership with key telco operators and metro Ethernet providers worldwide. Another feature is removing expensive routing hardware by provisioning connectivity and services via the BD-WAN cloud and using commodity hardware at remote sites. Another feature is bringing public cloud services as well as content services seamlessly to the customers' doorstep as part of a standard WAN offering. BD-WAN customers don't need to subscribe on their own with another public or content provider, as these services will be bundled in the BD-WAN service.

OpenCT Load Balancing Gateway (LBG) is a device that sits within the premises of OpenCT's strategic partner networks. Its main functions are: Support the registration process of new Blockchain nodes for the partner's end-clients; Translate from fiat, credit card, bank, multi-cryptocurrency exchange services, etc. into OCT Tokens—to mask the token utility process from an end-client perspective; Provide a buffer of tokens (between payment cycles) needed to unlock services subscribed by end-clients; Synchronize or route transactions between multiple private and public Blockchains; Route services from other Blockchains across OpenCT in support of OpenCT end clients. For example: Golem network supports the distribution of inexpensive multithreaded compute services. These decentralized compute services can be routed through OpenCT's LBG and delivered to end-clients.

BD-WAN architecture is based on the SD-WAN model and operates in a token-based approach. Customer units are installed on premises and virtually use tokens to deal with the central controller in order to "unlock" their selected services thus controlling their usage and enabling selection of their services carefully.

BD-WAN Operation: Token Model Details

The BD-WAN CPE use crypto tokens to "virtually pay" for their communications with the BD-WAN Controller to unlock the service(s) they will use. That is a crypto payment using the OCT token which is the fuel of the OpenCT platform. The crypto payments are all in the form of transactions happening on the Blockchain (broadcasted to all nodes for further verification and for miners to pack them into proper blocks).

Inter-Domain MPLS Traffic Engineering is a direct service that customers can leverage following their BD-WAN service subscription. It is targeted to those customers who are running multiple MPLS clouds and still need to offer MPLS Traffic Engineering service across these MPLS clouds. MPLS Traffic Engineering operates seamlessly inside a single MPLS cloud but the Inter-Domain MPLS Traffic Engineering requires additional protocols to run, one of which is BGP-LS, that will be replaced by OCT Blockchain in BD-WAN.

As the different applications/traffic are asynchronous by nature—no signaling to identify the exact amount to be sent—the BD-WAN Units are required to pay at least the minimum amount for each service (minimum threshold). It is then the role of the BD-WAN Controller as well as the BD-WAN Units to set/reset special counters that will be used as reminders for ongoing payments required for smooth operation.

To ensure smooth and uninterrupted operation, the BD-WAN architecture follows the "fail-safe" approach, meaning that the operation continues as usual even if the Units do not pay the Controller in a timely manner.

The BD-WAN Controller interoperates with the BD-WAN Unit from the Initial State as illustrated in FIG. 7, to a Steady State where the counters are about to expire on the BD-WAN Controller as shown in FIG. 8 and another Steady State where the timers are about to expire on the BD-WAN units as shown in FIG. 9. Interrupts are handled as illustrated in FIG. 10. Conflicts on the BD-WAN Controller are handled as shown in FIG. 11. The BD-WAN Controller controls every kind of component underneath it. It is the brains of all of the architecture. It ensures that Policies are effected. It governs OpenCT Routing Decisions. Background Information may include that the system works within an existing vendor, and between vendors, provides for Old School Fiber swapping (now at a specific block level), may specify traditional parameters including whether destination based (each routing decision is based on the destination, and each route forwards to the destination), Performance Based Routing (PBR) including QOS, Performance, Congestion (Performance). Note that SD-WAN uses PBR and Traditional. Allows for OSPF/BGP Killer.

Open CT Routing Decision Factors include Traffic, including Outage: Cables changing/can switch from broken cable (outage) to working cable in milliseconds, Performance: Can also switch to faster performing routes, not just broken routes, QOS—Quality of Service. OpenCT Routing Decision Factors also include Applications including VOIP, Data, Real Time activities, Class of packet includes Applications that are critical/voice (video) vs. bulk payload vs. Video. Routing Decision Factors also include Network Convergence (Outage), Internal Customer Policy and Price: Can also switch to lower cost routes, or higher quality higher priced routes including, e.g., time of day.

An Inbound Request, for example, may include communication between 2 branch offices. BD-WAN unit will intercept the packet request. Branch 1 will send the header information to the BD-WAN Controller along with signaling information. Based on the global map, the controller will determine where to send the traffic based on efficiency. The Controller will send relevant information back to the BD-WAN Unit. The BD-WAN Unit will make the necessary forwarding decision. The exemplary system may involve failover BD WAN Controllers as a Cluster. There is geographic separation. This acts as a failover. It is then the role of the BD-WAN Controller as well as the BD-WAN Units to set/reset special counters that will be used as reminders for ongoing payments required for smooth operation. To ensure smooth and uninterrupted operation, the BD-WAN architecture follows the "fail-safe" approach, meaning that the operation continues as usual even if the Units do not pay the Controller on time and the pertinent account is in arrears.

Description of PoT (Proof of Trust)

As background, Blockchain technologies provide valuable trusted technical components that allow for a transaction to be validated by the Blockchain network of servers and miners. Current Blockchain mining is designed to become more complicated over time to ensure security against faster and more powerful computers breaking the security encryption during a mining operation. This in turn requires a combination of increased computing power and energy on the part of the miner. For slow transactions where miners are rewarded for these transactions, this works just fine. However, for high volume, low value transactions, this type of encryption/decryption becomes a burden on the part of the application.

Proof of Trust allows a Miner Trust Value to be created that allows a transaction to use lesser encryption, thereby reducing compute and energy requirements on the part of the Miner to perform a transaction. This further allows for larger volume of transactions to be spread out requiring lower compute power and energy for high volume transactional Blockchain applications.

The Blockchain Mining Algorithm plays a significant role in what can be done with the model including the mining activities and rewards to a large decentralized community. PoD (Proof of Duration) which when used in combination with PoS (Proof of Stake) or DPOS (Delegated Proof of Stake) provides for a more democratic approach to mining and consensus. The OCT Token utilizes this PoD algorithm to address the token mining speed and security required for managing large volumes of transactions onto the Blockchain. A block production rate that can be exceptionally fast, upwards of 100,000 TPS (Transactions Per Second).

An aspect of PoT is a Proof of Trust (PoT) (Crypto Trust Rating (CTR)). This is a mathematical equation utilizing one or more of: The Number of Tokens a miner has in their wallet, the Time Duration a miner has held those tokens, the Risk Value of the transaction type, and the Consensus ranking of the Miner. The separation of High, Medium and Low is an arbitrary assignment, meaning there can be an infinite number of rankings and weightings for each of the defined segments. Examples, as follows, are shown only for discussion purposes, not for actual implementation purposes and not in any way to restrict the scope of the present disclosure.

PoS (Proof of Stake) or DPOS (Delegated Proof of Stake)
  Number of Tokens owned by the miner/node:
    High—$10,001 to unlimited worth of OCT Tokens
    Medium—$101 to $10,000 worth of OCT Tokens
    Low—$0.01 to $100 worth of OCT Tokens
  Proof of Duration (PoD):
    High—Greater than 1 year
    Medium—1 week to 1 year
    Low—0 minutes to 1 week
  Risk Value:
    High—Currency, Legal Contracts, Government Laws, Real Estate
    Medium—Digital Records (Per Usage Billing For Telecommunications)
    Low—Social Media Messages, SteamIt, Telco Signaling Apps
  Reputation: (Consensus Duration: (QoS (Response))
  How many times the miner has transacted a consensus transaction on the
  Blockchain. Used to show QoS.
    High—100,001 and Up
    Medium—1,001 to 100,000
    Low—None to 1,000
  Encryption Complexity:
  Plays into the compute power available at the client end, and the time/power necessary to encrypt/decrypt a transaction.
    High—AES-256
    Medium—AES-192
    Low—AES-128
  Voting Activities:
  Participation within the Blockchain. On screen activities.
    High: Always Active
    Medium: Active
    Low: Not Active
  Security Level:
  Concerns the algorithm used to encrypt/decrypt transactions and the ability of the client device to handle the calculation. Both miner and Blockchain need to agree to perform these transactions.
    Top secret: Highest degree of protection for information that is paramount in national defense matters and whose unauthorized disclosure may cause extremely grave danger or damage to the nation.
    Secret: Unauthorized disclosure of which may result in serious damage or danger.
    Confidential: Unauthorized disclosure of which may undermine operations.
    Restricted: Unauthorized disclosure of which is undesirable.
    None: Not secret, Public
  Commitment
    High
    Medium
    Low OCT Rating: Miners are allowed to mine for specific types of transactions based on their OpenCT Rating (OCTR), which is determined via a Miner Trust Value Calculation. Miners are rewarded differentially based on the Risk Value of the transaction, and the number of transactions they are allowed to mine based on their OCTR or Miner Trust Value.

Description of Token Crowdsale

OpenCT intends to conduct a token crowdsale funding the OpenCT platform as per SEC guidelines/rules. Details are provided herein in the interest of full disclosure of all known aspects of OpenCT. Until the OpenCT platform is fully operational, the Ethereum Blockchain will be leveraged for the creation of the OCT token and this will also be the platform of choice for all of the crowd-sale activities. Initially the OCT tokens will be launched as ERC-20 tokens over the Ethereum platform via proper smart contracts: a smart contract for the pre-token crowdsale and another one for the tokencrowdsale. The token designation at these stages will be 'OCTb' or OCT before-platform.

There will be a finite maximum number of OCTb tokens of 250,000,000 (250 M) tokens as shown in FIG. 22. A pre-token crowdsale and a tokencrowdsale will take place in sequence. Both pre-token crowdsale and token crowdsale combined will represent 50% of the maximum supply of tokens.

All potential private investors, pre-token crowdsale investors, and token crowdsale investors will be able to acquire OCTb via any available payment method. The available crypto payment methods will beETH and BTC, and possibly others. The traditional FIAT payment methods will bedebit/credit cards, PayPal, and wire transfer.

The OCTb tokens will be swapped to OCT tokens after the development of the OpenCT platform. With the OpenCT platform fully functioning, the OCTb tokens will be swapped to OCT tokens in a 1:1 ratio. A special wallet for the OCT token as well as a swapping mechanism will be provided when finalized.

The smart contract that receives the crypto funds during the pre-token crowdsale and token crowdsale are multisignature wallets requiring the signatures of more than one OpenCT board executive for any transfer or cash out operations.

Tokens purchased during the pre-token crowdsale and token crowdsale will be distributed to investors in 1-2 week periods after the conclusion of the token crowdsale. Unsold tokens during the pre-token crowdsale and the token crowdsale will be burned out to protect the integrity of the entire project.

During the pre-token crowdsale, 10% of the total maximum supply—25,000,000 (25 M) OCTbtokens—will be available for purchase directly or via any private deal. The OCTb token price will follow an increasing step function as follows: For the first month of the pre-token crowdsale; the token price will be at US$0.75 (its equivalent in ETH). For each consecutive month, the price of token will increase by US$0.0375, i.e. US$0.7875 for the second month, US$0.825 for the third month, US$0.8625 for the fourth month and US$0.9 for the fifth month.

For private deals that constitute more than 15% of the pre-token crowdsale, token share (more than 3,750,000 OCTb tokens), special bonuses will apply but the tokens will be held in the smart contract for periods that depend on the investment for the sole reason of protecting public investors' investments.

For any private deal that constitutes between 15%-20% of the pre-token crowdsale token share (between 3,750,000 and 5,000,000 OCTb tokens), the token price will get a 20% discount from its original pre-token crowdsale price (US$0.6 equivalent in ETH), but the sold tokens for that private deal will be locked in a smart contract and will be released by 50% every 12 months over a 2-year period.

For any private deal that constitutes more than 20% of the pre-token crowdsale token share (more than 5,000,000 OCTb tokens), the token price will get a 25% discount from its original pre-token crowdsale price (US$0.5625 equivalent in ETH) but the sold tokens will be locked in a smart contract and will be released by 50% every 18 months over a 3-year period.

During the token crowdsale, 40% of the total maximum supply—100,000,000 (100 M) OCTb tokens—will be available for purchase. During the course of the token crowdsale, instead of following a bonus structure common in the crypto world, the OCTb token price will follow an increasing linear function where:

The price of the first token will be equivalent to the starting price of the pre-token crowdsale (US$0.75) multiplied by a 25% increase factor (US$0.9375 equivalent in ETH); and The price of the last token will be equivalent to the starting price of the pre-token crowdsale (US$0.75) multiplied by a 75% increase factor (US$1.3125 equivalent in ETH).

Figure 23:
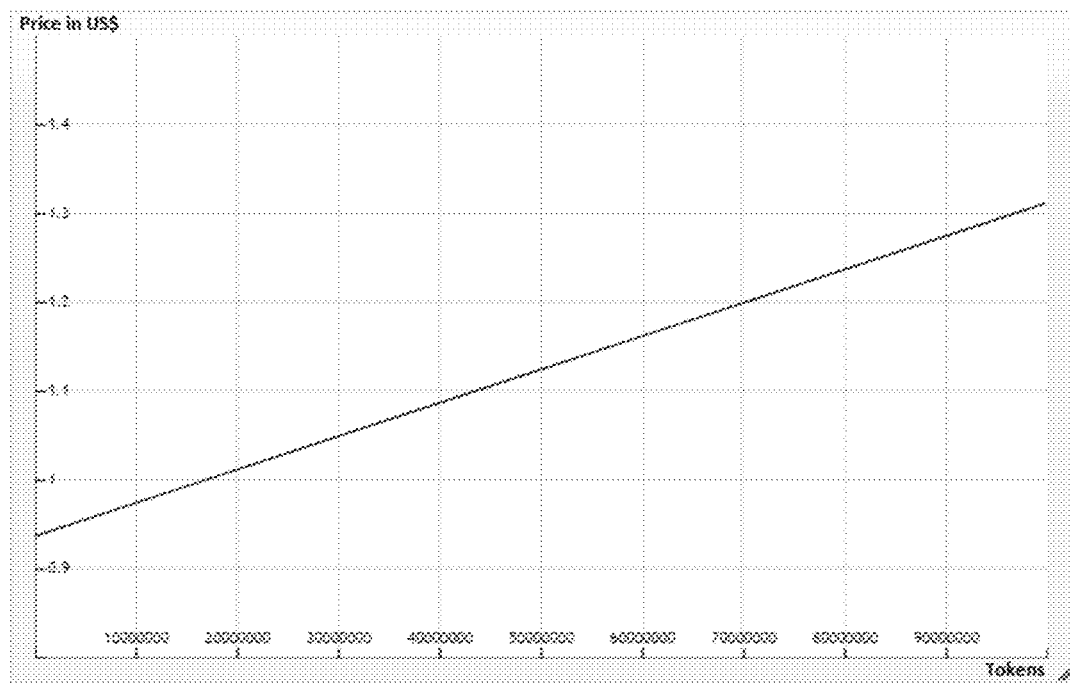
FIG. 23 shows a linear equation which graphically represents the price of Tokens versus the number of Tokens.

In order to craft the linear equation (shown graphically in FIG. 23); the inputs are stated as follows:

The amount of OCTb tokens available to be sold during the token crowdsale is 100,000,000

In the examples and use cases below, the calculations are in US$. It is worth noting that the real implementation will be based on ETH, according to its exchange rate against the US$.

F, the price of the first ever OCTb token to be offered during the token crowdsale is equivalent to $0.9375.

L, the price of the last ever OCTb token to be offered during the token crowdsale is equivalent to $1.3125.

So for any OCTb token (t) that comes in between the first and the last tokens, its price is determined by a linear function called P(t):

$$P(t) = 0.9375 + \frac{0.375}{100,000,000} * t$$

Where the '0.375' value is the difference between the final and initial prices in US$.

As an example, imagine an investor who holds a certain amount of US$ (U) and he wants to invest that amount by participating in the token crowdsale and purchasing (B) tokens. Further imagine that at the same time this investor wants to participate and buy tokens, there is actually (A) tokens that have been sold for other investors.

Figure 24:
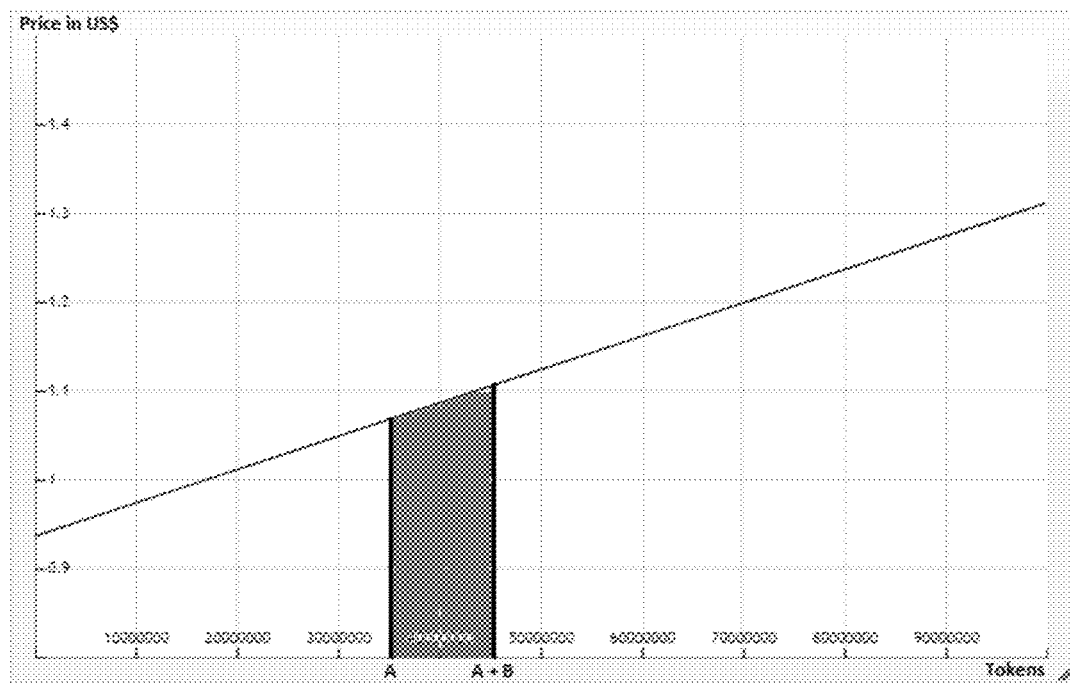
FIG. 24 shows the price of OCTb tokens along a linear function which an investor will initially pay and the final price the investor will be quoted.

By reference to FIG. 24, as the price of the OCTb tokens during the token crowdsale is determined by a linear function, so the initial price for the tokens that this investor will pay is just on the P(A) mark and the final price the investor will be quoted is P(A+B).

In order to identify how many tokens this investor will be able to acquire with the U amount of US$, the following equation must be solved (finding the shaded area under the curve between A and A+B):

$$U = \int_A^{A+B} P(t)dt = \int_A^{A+B} \left(0.9375 + \frac{0.375\,t}{100,000,000}\right)dt$$

Solving this integral function gives us:

$$U = (0.9375) * (B) + \frac{0.375}{2 * 100,000,000} * \left(B^2 + 2AB\right)$$

Making a few assumptions for the variables in this equation in order to give an example:

$U = 100$ US$ and $A = 1,000,000$ Tokens

So:

$$100 = (0.9375) * (B) + \frac{0.375}{2 * 100,000,000} * \left(B^2 + 2,000,000B\right)$$

Putting it in the normal $2^{nd}$ degree equation format:

$0.000000001875B^2 + 0.94125B - 100 = 0$

Then:

$B = 106.24167737364769$ Tokens

In order to calculate the full amount in US$ that will be raised during the tokencrowdsale, use $A=0$ and $B=100,000,000$.

As:

$$U = (0.9375)*(B) + \frac{0.375}{2*100{,}000{,}000}*(B^2 + 2AB)$$

Then:

$$U = (0.9375)*100{,}000{,}000 + \frac{0.375}{2*100{,}000{,}000}*(100{,}000{,}000^2) =$$

US\$ 112,500,000

The minimum cap for both the token pre-crowdsale and crowdsale is set at the US$15 M mark while the maximum cap is only limited by the number of available tokens during the token crowdsaleas well as the duration of the token crowdsale. If that minimum cap condition is not met, the smart contract will reverse itself automatically and the money (crypto or traditional FIAT) will be paid back to the investors (from both phases: pre-crowdsale and crowdsale). The OCTb token will be available for trading 4 weeks after the conclusion of the token crowdsale at the selected exchanges. The selected exchanges will be shared with the OpenCT community in a timely manner.

Figure 25:
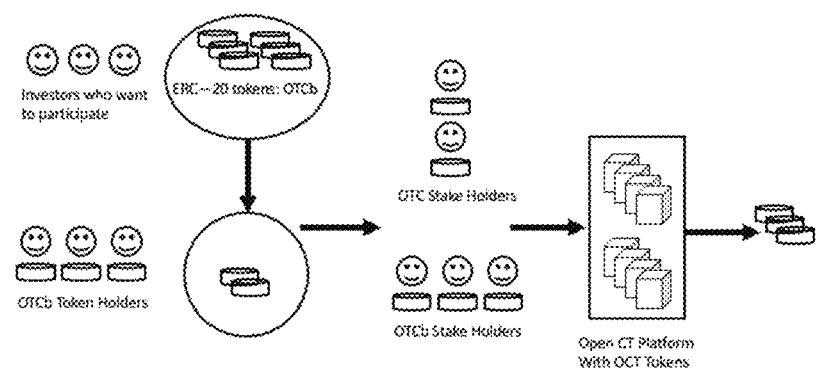
FIG. 25 shows the OpenCT rewarding system described herein, including a Miner Reward System.

FIG. 25 shows the OpenCT rewarding system, including a Miner Reward System. The OpenCT platform has a unique rewarding structure (as referenced in FIG. 13) for its users. To understand the rewarding structure, the users of the platform must first be defined. The users are miners (block producers) who download the platform, keep it running in order to verify the broadcasted transactions and pack them into proper blocks to be hard coded (glued) to the Blockchain. Anyone can participate in the OpenCT operation as a user. There are two ways to do that but both require holding some amount of tokens in their wallet: (1) OCTb/OCT Token large-amount holders: These holders either participated in the pre-token crowdsale and/or token crowdsale (OCTb token), bought tokens after the conclusion of the token crowdsale (OCTb token), or bought tokens after the launch of the OpenCT platform (OCT token). These large-amount token holders will be selected and nominated via the PoS algorithm in proportion to their actual holdings, to become block producers and hence to be rewarded accordingly. (2) OCT Token low-amount holders: These holders bought OCT tokens after the launch of the OpenCT platform. These low-amount holders will be selected and nominated via the PoD algorithm in proportion to the longest duration they have kept at least one (1) OCT token in their wallet, to become block producers and hence to be rewarded accordingly.

The rewarding structure of the OpenCT platform is unique. It is structured according to the mathematical constant 'e' (base of the natural logarithm) and the Bernoulli compound interest formula as detailed below. The total number of tokens used to reward the block producers represents 15%—37,500,000 tokens—of the maximum supply of tokens. The structure starts by assigning a fixed number of reward tokens per year over a five (5) year period. This number decreases year-over-year. A fixed annual profit is chosen for each year, again in a decreasing fashion, in a way to attract more adopters (and hence block producers) at the start of the OpenCT platform operation while attracting more users over a five-year period.

Solving Bernoulli's formula for the first year, given the inputs detailed above:
Initial Value for the first year=7,000,000 tokens
Annual interest (R) for the first year=30%, so R=0.3
The number of years (t) in this situation is 1
The original equation is:

Total value=Initial Value*$e^{Rt}$

So, the maximum number of tokens that can be offered as rewards for the first year will be equal to:

7,000,000*$e^{0.3}$=9,449,012 Tokens.

The same calculation applies to the second, third, fourth and fifth years.
The sum of all maximum compounded number of tokens over the 5-year period is:
37,447,312
Thus it is clear that according to the Bernoulli formula with the mathematical constant 'e' that the maximum number of reward tokens offered over the 5-year period will never exceed 37,500,000 tokens (the available number of reward tokens according to the token distribution structure). This approach will insure that the actual rewarding figures will never exceed what will be reserved for the rewarding structure. Taking the third year as an example, the composite interest will be compounded every week, so:
Initial Value for the third year=6,000,000 Tokens
Annual interest (R) for the third year=22%, then R=0.22
n=52

The equation for the number of tokens for the third year after the weekly compounding is:

$$\text{Initial Value}*\left(1 + \frac{R}{n}\right)^n$$

Substituting:

$$6{,}000{,}000*\left(1 + \frac{0.22}{52}\right)^{52} = 7{,}472{,}992 \text{ Tokens.}$$

As the fixed number of assigned reward tokens decreases year over year, so does the annual profit. That is balanced by compounding more frequently year over year. Tabulations resulting from the aforementioned computations are shown in FIG. 28.

OpenCT Marketplace

The OpenCT Marketplace allows users of the system to purchase items including tokens, network bandwidth, and digital assets. FIG. 29 shows an exemplary embodiment of the OpenCT Marketplace focused on Bandwidth transactions. As shown in FIG. 29, a Request is made of the system to send digital assets through a network. The OpenCT Marketplace reviews the assets to be sent through the network, determines which network has the appropriate bandwidth and price for the package, and sends the package to the destination using the appropriate/correct Telco and Telco client/network.

The OpenCT Marketplace may also be used for Tokens as well as other types of transactions. In regard to Tokens, it is, for example, a Centrally Managed Token system for managing the OpenCT Token. It manages Initial value of the OpenCT Token using OpenCT Crowdsale to establish the Token value. It manages access to the Tokens for buyers and sellers. It also manages the exchange of tokens for use in the network.

It is to be understood that other applications for, and combinations of, the subject OpenCT Blockchain based system are possible, and that though not specifically set forth in this document, that the spirit of the invention may be practiced in other ways, all of which are encompassed by the disclosure herein.

The invention claimed is:

1. A method performed by a computer system that includes a central computing device, memory, a hard drive, and a network, the computer system configured to communicate via the network with a centrally managed distributed blockchain computing system that includes multiple computing nodes, each computing node storing a copy, or a portion thereof, of a blockchain of the centrally managed distributed blockchain computing system, the method comprising:

storing at least one ordered list of a plurality of data transaction requests, each of the plurality of data transaction requests including header data for a transaction, a type identifier and a quantity value; and storing a plurality of digital wallets that are each associated with different client entities, wherein each of the plurality of digital wallets is linked to at least one corresponding private cryptographic key and at least one identifier that has been generated based on the at least one private cryptographic key;

receiving, via the central computing device, memory, hard drive and network and from different remote computing devices, electronic data messages that each include data transaction requests;

adding a received first data transaction request, which is associated with a first digital wallet of the plurality of digital wallets, to the at least one ordered list;

receiving a second data transaction request which is associated with a second digital wallet of the plurality of digital wallets;

identifying a match between at least the stored first data transaction request and the received second data transaction request;

generating a first hash identifier based on and corresponding to data included in the first digital wallet;

generating a second hash identifier based on and corresponding to data included in the second digital wallet;

generating a first blockchain transaction that is based on the first hash identifier and the second data transaction request and submitting, to at least one node of the multiple computing nodes of the centrally managed distributed blockchain computing system, the generated first blockchain transaction for inclusion into the blockchain of the centrally managed distributed blockchain computing system;

generating a second blockchain transaction that is based on the second hash identifier and the first data transaction request and submitting, to at least one node of the multiple computing nodes of the centrally managed distributed blockchain computing system, the generated second blockchain transaction for inclusion into the blockchain of the centrally managed distributed blockchain computing system;

verifying that the first blockchain transaction and the second blockchain transaction have been included into the blockchain; and based on verification that the first blockchain transaction and the second blockchain transaction have been included into the blockchain, updating at least one record of a database that is external to the centrally managed distributed blockchain computing system.

2. The method of claim 1, wherein the data transaction requests or blockchain transactions are evaluated via a Proof of Trust mathematical equation utilizing one or more of: a number of tokens a cryptocurrency Miner has in a wallet of the cryptocurrency Miner, a Proof of Stake criterion, a Proof of Duration criterion, Risk Value, QOS, Encryption, Voting Activity, Security Level, Commitment, an OpenCT Risk criterion in regard to a transaction type, and a Consensus ranking of the cryptocurrency Miner.

3. The method of claim 1, further including the step of selling tokens to investors.

4. The method of claim 1, further involving use of a marketplace for buying and selling of tokens to and by users of the system.

5. The method of claim 1, further including the step or steps of buying and/or selling network access to users of the system.

6. The method of claim 1, wherein the centrally managed distributed blockchain computing system on which the method is performed is capable of control plane functions, instruction functions, reporting and auditing in real time.

7. The method of claim 1, wherein the centrally managed distributed blockchain computing system is used as a ledger as part of the dissemination of Layer 2 networking information across a routed network which is used for managing assets.

8. The method of claim 7, wherein the Layer 2 networking information is transmitted over a Layer 2 VPN solution using the public Internet for traffic.

9. The method of claim 7, wherein the distributed blockchain computing system operates in a scalable multipoint fashion in which signaling is performed via the Blockchain.

10. The method of claim 7, wherein multicast and broadcast traffic is handled via head-end replication.

11. The method of claim 1, wherein the centrally managed distributed blockchain computing system uses smart contracts associated with the build-up and tear down of network circuits to provide bandwidth on demand using the system for network transactions.

12. The method of claim 11, wherein the system used by the method incorporates a controller that is northbound which is controlled via blockchain.

13. The method of claim 11, wherein nodes are installed in the system used by the method to which local WAN resources are directly connected via a network.

14. The method of claim 12, further including the use of secure communications between the controller and the centrally managed distributed computing system.

15. A method performed by a computer system that includes a central computing device, memory, a hard drive, and a network, the computer system configured to communicate via the network with a centrally managed distributed blockchain computing system that includes multiple computing nodes, each computing node storing a copy, or a portion thereof, of a blockchain of the centrally managed distributed blockchain computing system, the method comprising:

storing at least one ordered list of a plurality of data transaction requests, each one of the plurality of data transaction requests including header data for a transaction, a type identifier and a quantity value; and storing a plurality of digital wallets that are each associated with different client entities, wherein each of the plurality of digital wallets is linked to at least one corresponding private cryptographic key and at least one identifier that has been generated based on the at least one private cryptographic key;

receiving, via the central computing device, memory, hard drive and network and from different remote computing devices, electronic data messages that each include data transaction requests;

adding a received first data transaction request, which is associated with a first digital wallet of the plurality of digital wallets, to the at least one ordered list;

receiving a second data transaction request which is associated with a second digital wallet of the plurality of digital wallets;

identifying a match between at least the stored first data transaction request and the received second data transaction request;

generating a first hash identifier based on and corresponding to data included in the first digital wallet;

generating a second hash identifier based on and corresponding to data included in the second digital wallet;

generating a first blockchain transaction that is based on the first hash identifier and the second data transaction request and submitting, to at least one node of the multiple computing nodes of the centrally managed distributed blockchain computing system, the generated first blockchain transaction for inclusion into the blockchain of the centrally managed distributed blockchain computing system;

generating a second blockchain transaction that is based on the second hash identifier and the first data transaction request and submitting, to at least one node of the multiple computing nodes of the centrally managed distributed blockchain computing system, the generated second blockchain transaction for inclusion into the blockchain of the centrally managed distributed blockchain computing system;

verifying that the first blockchain transaction and the second blockchain transaction have been included into the blockchain; and based on verification that the first blockchain transaction and the second blockchain transaction have been included into the blockchain, updating at least one record of a database that is external to the centrally managed distributed blockchain computing system;

wherein the centrally managed distributed blockchain computing system is used as a ledger as part of the dissemination of Layer 2 networking information across a routed network which is used for managing assets including the step or steps of buying and/or selling network access to users of the system, wherein the Layer 2 networking information is transmitted over a Layer 2 VPN solution using the public Internet for traffic, and wherein the centrally managed distributed blockchain computing system uses smart contracts associated with the build-up and tear down of network circuits to provide bandwidth on demand using the system for network transactions.

16. The method of claim 15, wherein the data transaction requests or blockchain transactions are evaluated via a Proof of Trust mathematical equation utilizing one or more of: a number of tokens a cryptocurrency Miner has in a wallet of the cryptocurrency Miner, a Proof of Stake criterion, a Proof of Duration criterion, Risk Value, QOS, Encryption, Voting Activity, Security Level, Commitment, an OpenCT Risk criterion in regard to the transaction type, and the Consensus ranking of the Miner.

17. The method of claim 15, wherein the centrally managed distributed blockchain computing system on which the method is performed is capable of control plane functions, instruction functions, reporting and auditing in real time.

18. The method of claim 15, wherein the distributed blockchain computing system operates in a scalable multipoint fashion in which signaling is performed via the Blockchain and wherein multicast and broadcast traffic is handled via head-end replication.

19. The method of claim 15, wherein the system used by the method incorporates a controller that is northbound which is controlled via blockchain.

20. The method of claim 15, wherein nodes are installed in the system used by the method to which local WAN resources are directly connected via a network.

* * * * *